United States Patent [19]

Omi et al.

[11] Patent Number: 5,646,749
[45] Date of Patent: Jul. 8, 1997

[54] COLOR IMAGE FORMING APPARATUS

[75] Inventors: Kyoji Omi, Kawasaki; Yasumori Nagahara, Fujisawa, both of Japan

[73] Assignee: Ricoh Company, Ltd., Tokyo, Japan

[21] Appl. No.: 618,152

[22] Filed: Mar. 19, 1996

[30] Foreign Application Priority Data

Mar. 20, 1995 [JP] Japan .................................. 7-060266

[51] Int. Cl.$^6$ ...................................................... H04N 1/50
[52] U.S. Cl. .............................................. 358/501; 347/115
[58] Field of Search ...................................... 358/501, 540, 358/300; 347/115, 128, 232; 355/326 R, 327

[56] References Cited

U.S. PATENT DOCUMENTS

| | | | |
|---|---|---|---|
| 5,040,031 | 8/1991 | Hayashi | 355/326 R |
| 5,428,464 | 6/1995 | Silverbrook | 358/501 |

Primary Examiner—Scott A. Rogers
Attorney, Agent, or Firm—Oblon, Spivak, McClelland, Maier & Neustadt, P.C.

[57] ABSTRACT

A color image forming apparatus is provided with a printer controller which is capable of receiving color image data for one page, which is divided into a plurality of data for each of a corresponding plurality of colors, at an irregular interval, and, upon receiving the image data for one color, driving an image forming device to form an image of the color whose data has been received, and after images of all of the plurality of colors are completed, outputting the final image on a recording media. The image forming device may also include, an intermediate image transfer belt for forming thereupon an image of each of the plurality of colors, superposing one on another, and a leading edge detect sensor to detect a leading edge of an image of each of the plurality of colors for registering the leading edges of images of the plurality of colors. The apparatus may further include, in addition to a scanner and a printer, a system controller which issues an image formation command for each of the plurality of colors to the scanner and the printer at a regular interval in a copy mode, and to the printer at an irregular interval in a print mode.

11 Claims, 17 Drawing Sheets

COLOR IMAGE FORMING APPARATUS

BACKGROUND OF THE INVENTION

1. Field of the Invention

The present invention relates to a color image forming apparatus which forms a full color image by performing image formation for each of cyan, magenta, yellow and black at an irregular interval.

2. Discussion of the Background

Generally, a conventional color image forming apparatus forms a full color image by performing image formation for each of such colors as, cyan (hereinafter referred to as 'C'), magenta (hereinafter referred to as 'M'), yellow (hereinafter referred to as 'Y') and black (hereinafter referred to as 'K'), in sequence at a regular interval, superposing one image on top of another. Such a method is called a sequential color image formation method and is suitable for use in a color copying machine, but is not necessarily suitable for use in a color printer for a host computer, which is becoming popular in recent years. Namely, there is a problem in such a method that a large data memory and a special hardware with high speed are required for storing and bit-mapping printing data for each of such colors, C, M, Y and K, and sending such bit-mapped printing data for each of the colors to an image forming device at a regular interval.

SUMMARY OF THE INVENTION

The present invention has been made in view of such a problem, and accordingly an object of the present invention is to provide a novel color image forming apparatus which is capable of receiving image data for each of cyan, magenta, yellow and black at an irregular interval without providing a memory device specifically for that purpose.

Another object of the present invention is to provide a novel color image forming apparatus which is capable of accomplishing registration of an image of each of C, M, Y and K even when image data for each of the colors is received by the apparatus at an irregular interval.

Still another object of the present invention is to provide a novel color image forming apparatus which is capable of accomplishing registration of an image of each of the colors even when image data for each of the colors is received by the apparatus at an irregular interval of long hours under changing environmental conditions.

Still another object of the present invention is to provide a novel color image forming apparatus which is capable of performing both color copying and color printing, the former in an efficient manner and the latter in an economical manner.

In order to achieve the above-mentioned first object, a color image forming apparatus according to the present invention includes an image data input device which receives color image data for one page of an original document in a form divided into a plurality of data for cyan, magenta, yellow and black. An image forming device converts the image data for each of the colors to a visible image. A printer controller, which receives image data for each of the colors at an irregular interval and drives the image forming device, upon receiving the image data for a color, forms an image of the color whose data has been received, and, after completing image formation for all of the colors by which a final image is formed, output the final image on a recording media as a visible image.

Further, in order to achieve the second object, the image forming device as mentioned above includes a device for detecting a leading edge of an image, and the printer controller performs a series of registrations for each of the images for C, M, Y and K based upon a detect signal from the leading edge detecting device.

Further, in order to achieve the third object, the image forming device as mentioned above includes an intermediate image transfer belt for forming thereupon an image for each of the colors one by one in sequence superposing one on top of another.

Further, in order to achieve the fourth object, a color image forming apparatus according to the present invention includes, for performing both copying and printing functions, a printer module, which includes an image data input device for receiving color image data for one page of an original document in a form divided into a plurality of data for C, M, Y and K. An image forming device converts image data for each of the colors to a visible image. A printer controller receives image data for each of the colors at an irregular interval, drives the image forming device, upon receiving image data for a color, to form an image of the color whose data has been received, and, after completing image formation for all of the colors by which a final image is formed, outputs the final image on a recording media as a visible image. A scanner module which includes an image reading device reads and separates an original image in color for each picture element. An image processing device converts color image data which are obtained by the image reading device to image recording data and an image data output device, and a system controller which includes a copy processor issues to the scanner module and the printer module an image formation command for each of the colors at a regular interval and a print processor issues to the printer module an image forming command for each of the colors at an irregular interval.

BRIEF DESCRIPTION OF THE DRAWINGS

A more complete appreciation of the present invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1A:
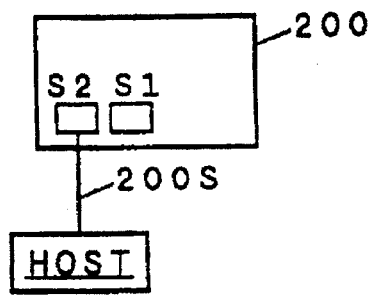
FIG. 1(a) is a block diagram illustrating an example of an image processing system wherein the scanner module is connected to an external equipment and used as a scanning device.

Referring now to the drawings, wherein like reference numerals designate identical or corresponding parts throughout the several views, embodiments of the present invention are explained.

First, a schematic structure of a color image forming apparatus according to the present invention is explained.

The color image forming apparatus according to the present invention includes three modules, a scanner module 200, a printer module 400 and a system control module 600. Various combinations of these three modules are possible depending upon a requirement, and five examples are illustrated in FIGS. 1(a)–1(c) and FIGS. 2(d) and 2(e). In these drawings, a square denotes a functional block, a HOST denotes an external module, such as a computer or a facsimile, and thick lines 200S and 400S between the modules denote a cable which connects the two modules and respectively transmits a control signal and an image signal, a SCSI cable in this embodiment.

Figure 1B:
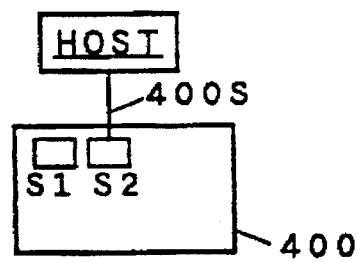
FIG. 1(b) is a block diagram illustrating an example of an image processing system wherein the printer module is connected to an external equipment and used as a printer.

FIG. 1(a) shows an example of a combination where the scanner module 200 is connected to a HOST as a scanning device, and FIG. 1(b) shows an example of a combination where the printer module 400 is connected to a HOST as a printer.

Figure 1C:
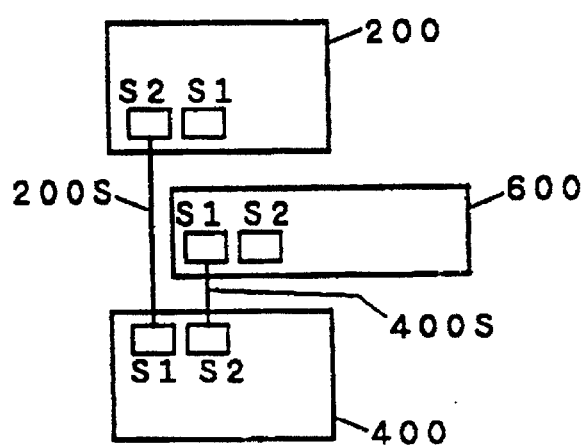
FIG. 1(c) is a block diagram illustrating an example of an image processing system wherein one each of the scanner module, the printer module and the system control module are connected to function as a standard copying machine.

FIG. 1(c) shows an example of a combination where one each of the scanner module 200, the printer module 400 and the system control module 600 are connected for functioning as a standard copying machine. In this case, the system control module 600 includes a copy processor CP (shown in FIG. 4), which controls the scanner module 200 and the printer module 400 integrally for performing a copying function.

Figure 2D:
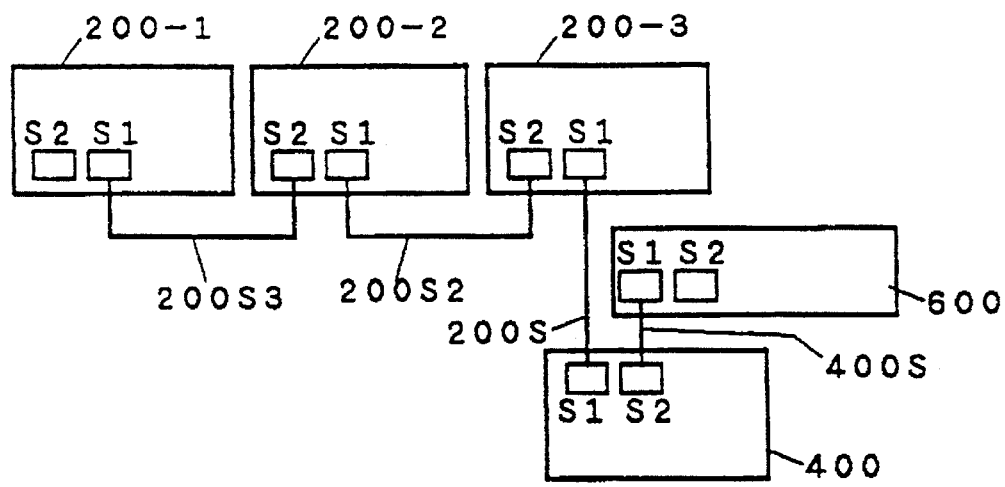
FIG. 2(d) is a block diagram illustrating an example of an image processing system having three scanning modules.

FIG. 2(d) shows an example of a combination for functioning as a copying machine having three scanning devices. In this example, a first scanner module 200-1, a second scanner module 200-2, a third scanner module 200-3, the printer module 400 and the system control module 600 are connected. If a user uses a different type of a scanner for each of the three scanner modules, for example, a scanner for a standard size, such as an A3 size, for the first scanner module 200-1, a scanner for a large size, such as an A1 size, for the second scanner module 200-2 and a color scanner for the third scanner module 200-3, the user can handles a wide variety of original documents without installing a copying machine for handling each type of an original documents respectively. Further, a module to be connected and a number of each module may be selected depending upon a requirement of the user. In this example, the system control module 600 includes a multiple scanners processor (one of the functions of the CP in FIG. 4), which controls these four modules integrally for performing a copying function.

Further, although not shown in the drawings, a plurality of the printer module 400 may be connected likewise. In such a case, the system control module 600 includes a multiple printers processor (one of the functions of the CP in FIG. 4), which controls other modules integrally for performing a copying function. A combined total of 7 modules of the scanner module 200 and the printer modules 400 can be connected.

Figure 2E:
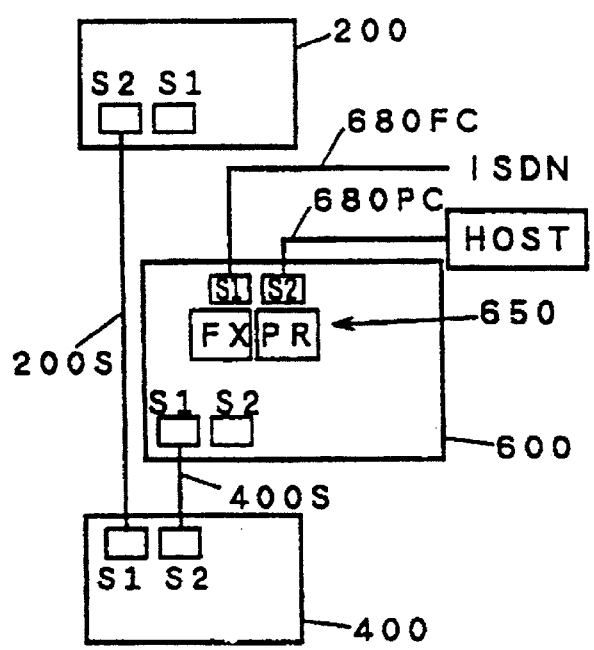
FIG. 2(e) is a block diagram illustrating an example of an image processing system functioning as a copying machine having facsimile and printing functions.

FIG. 2(e) shows an example of a combination, which includes the scanner module 200, the printer module 400 and the system control module 600, and performs a copying, a facsimile and a printing functions. The system module 600 includes a communication line 680PC and a communication unit 680P for connecting a host computer, a print processor PR (FIG. 4) which converts printing data, which is received from the communication unit 680 in a page descriptive language, into raster data, a communication unit 680F for connecting a public line 680FC and a color facsimile processor FX (FIG. 4) which decompresses data which are received by the communication unit 680F in a prescribed compression format and compresses image data which are read by the scanner module 200 to a prescribed compression format.

Figure 3:
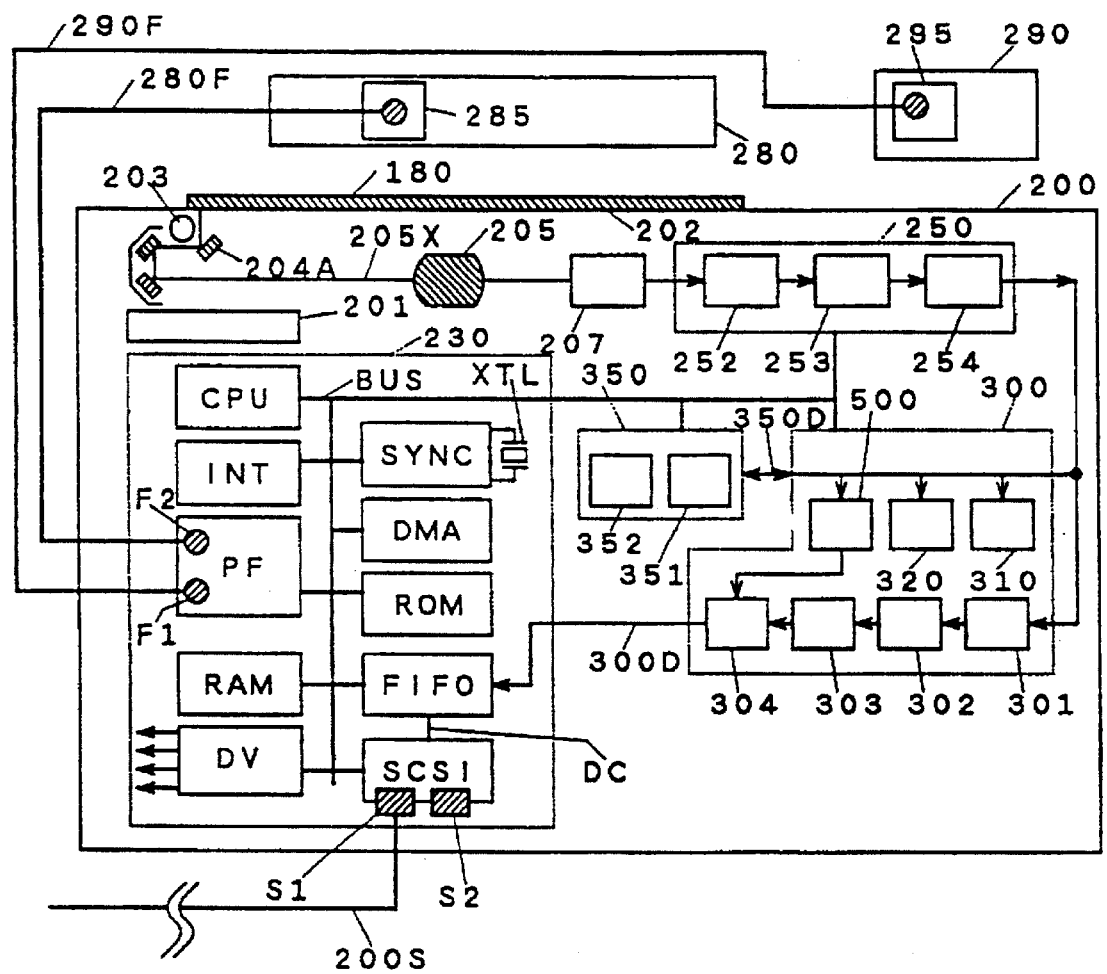
FIG. 3 is a block diagram illustrating an electrical structure of the scanner module.
Figure 4:
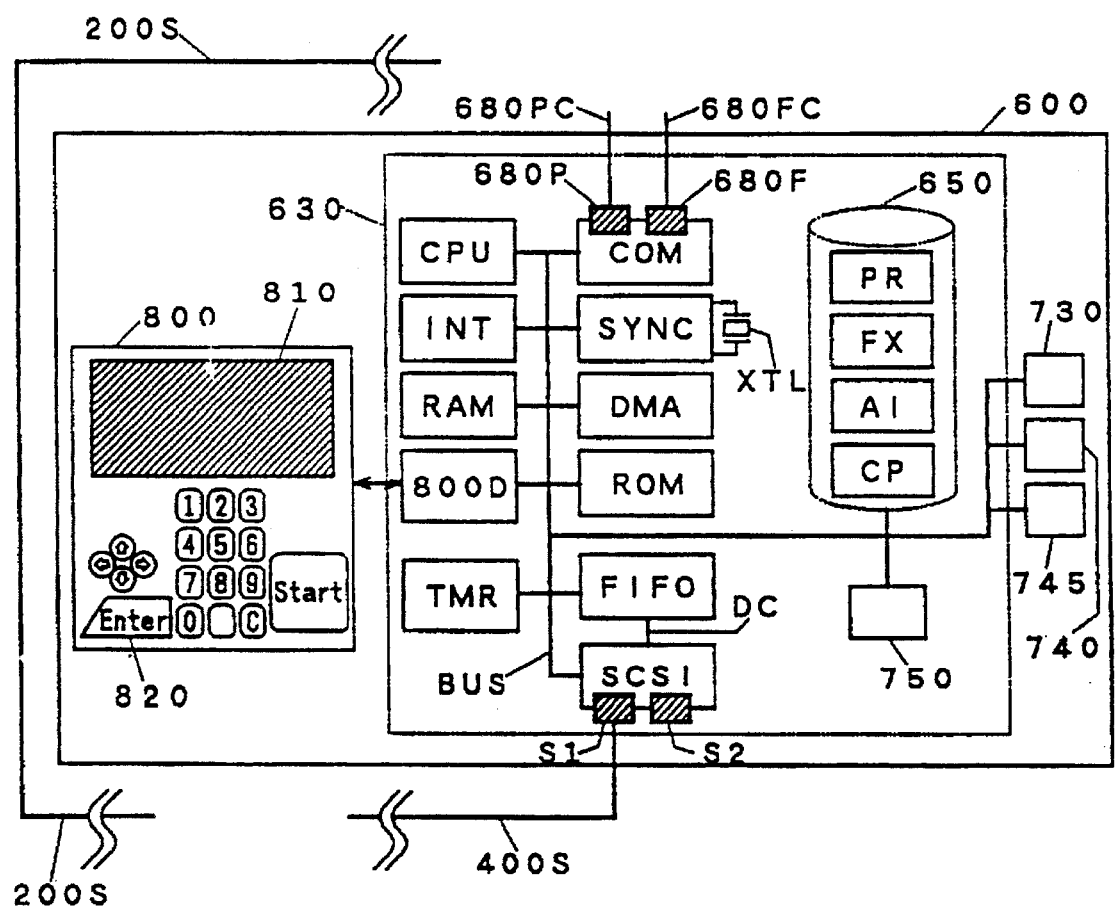
FIG. 4 is a block diagram illustrating an electrical structure of the system control module.
Figure 5:
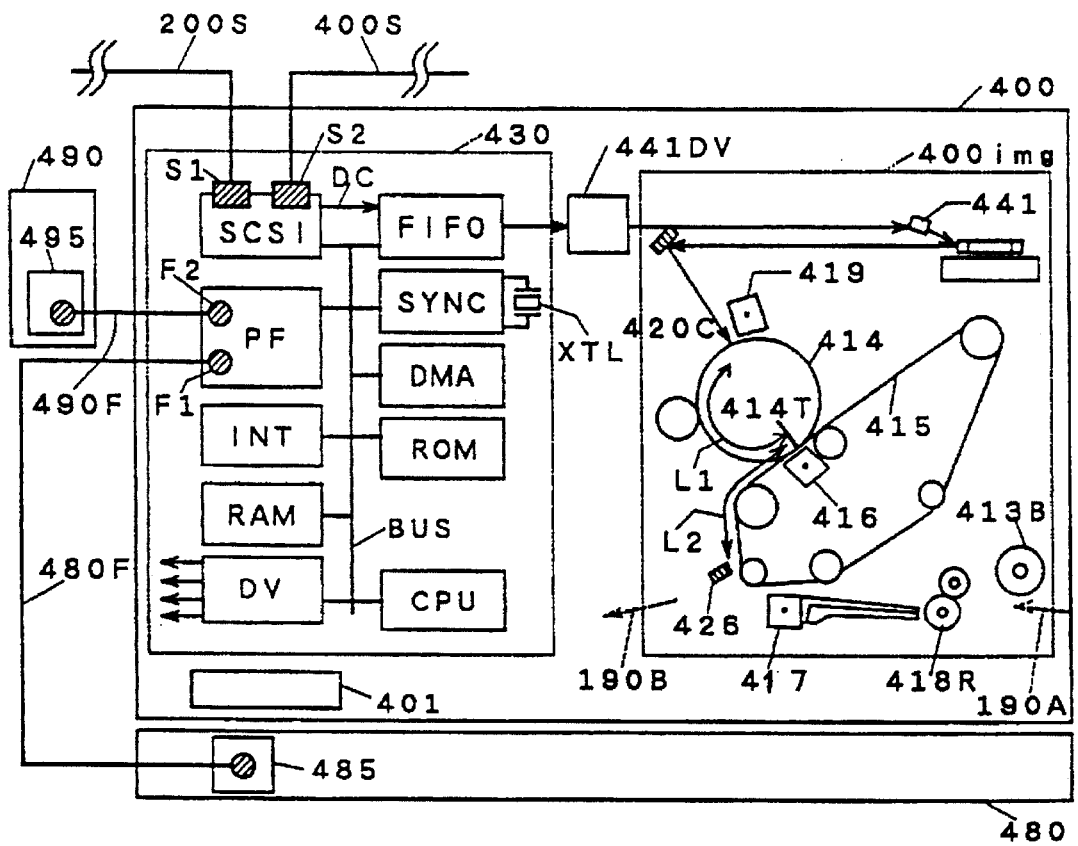
FIG. 5 is a block diagram illustrating an electrical structure of the printer module.
Figure 6:
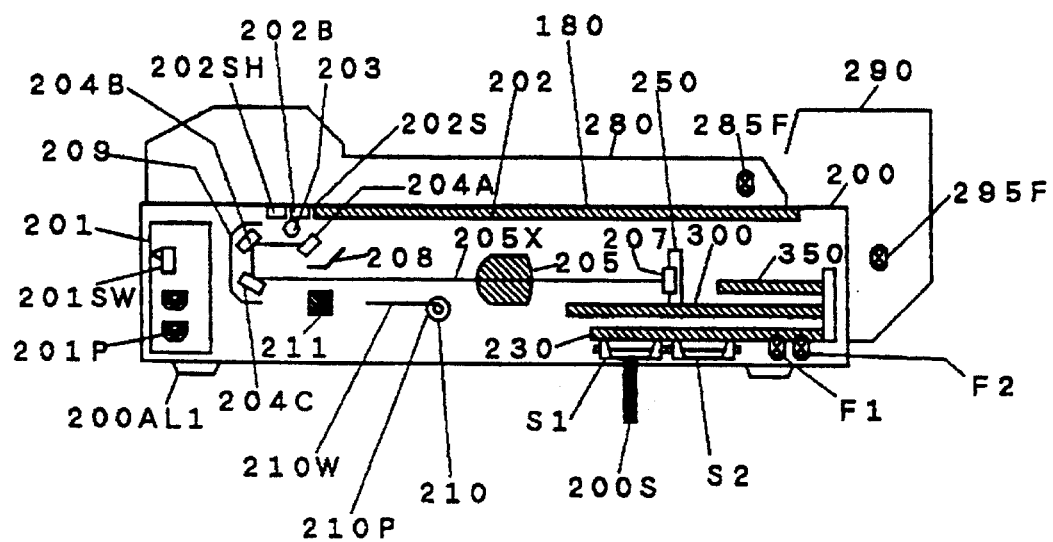
FIG. 6 is a schematic diagram illustrating a structure of the scanner module.
Figure 7:
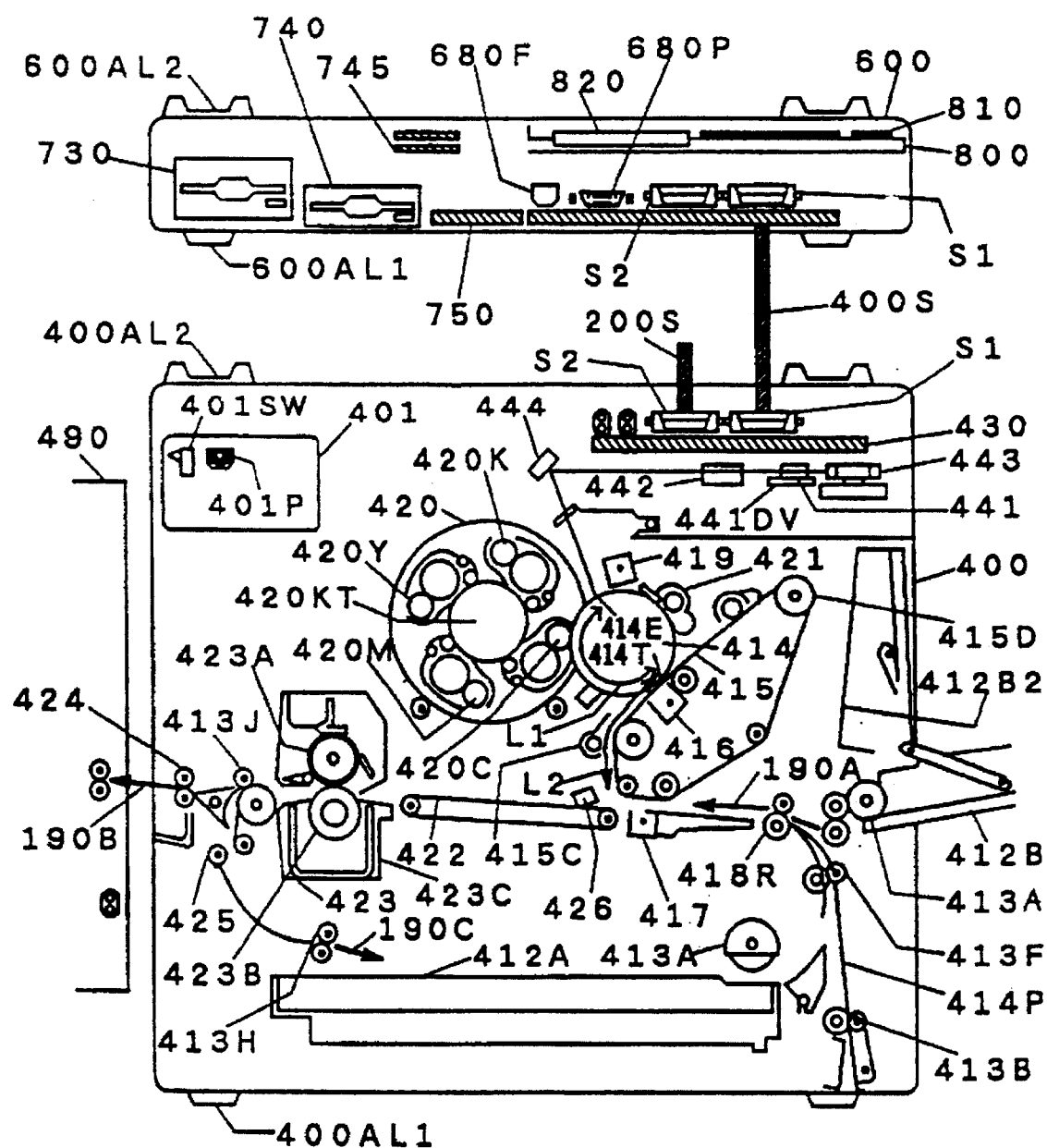
FIG. 7 is a schematic diagram of illustrating a structure of the system control module and the printer module.
Figure 8:
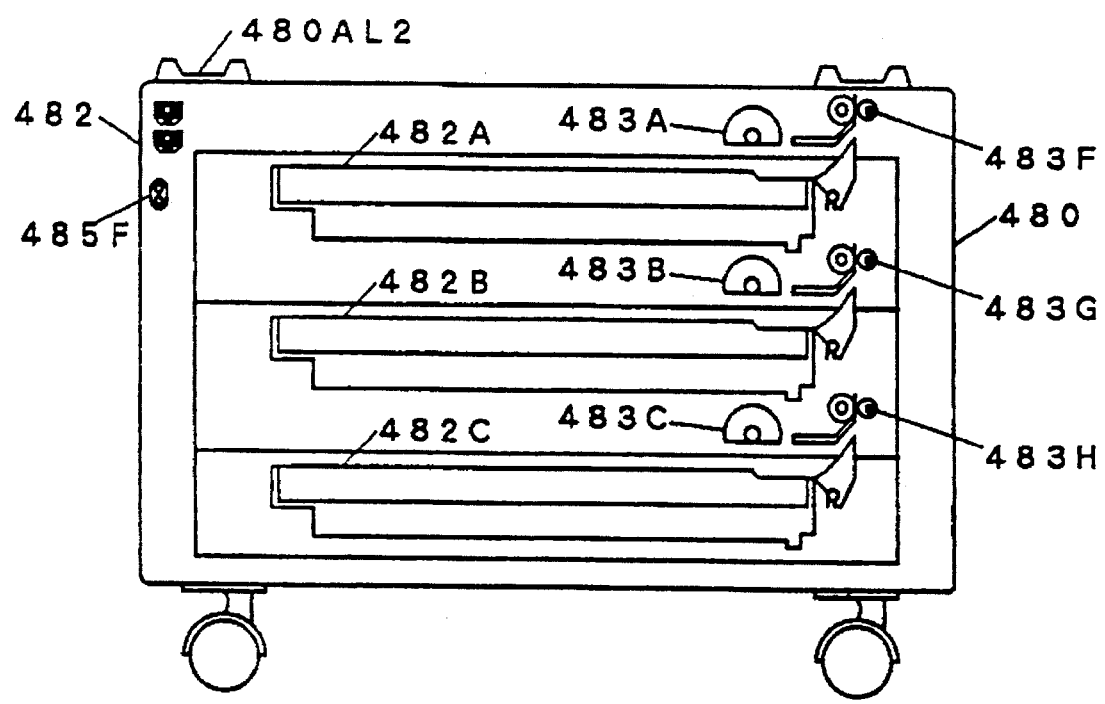
FIG. 8 is a schematic diagram illustrating a structure of a multiple paper feeders unit.

Now, an embodiment of a color image forming apparatus which includes copying, facsimile and printing functions is explained. The apparatus includes, in addition to the above-mentioned three modules 200, 400 and 600, additional optional modules, such as an automatic original document feeder (ADF) 280, a microfilm projector (FPU) 290, a multiple paper feeders unit 480 and a sorter 490. An electrical block diagram of the apparatus is divided into three parts and is shown in FIGS. 3, 4 and 5 respectively. The whole block diagram will appear by combining these three drawings, and connecting a signal line in one drawing with a signal line with the same denotation in another drawing. Likewise, FIGS. 6, 7 and 8 illustrate a structure of the apparatus, divided into three parts. The whole structure of the apparatus will appear by placing the printer module 400, which is shown in FIG. 7, on top of the multiple paper feeders unit 480 which is shown in FIG. 8, the system control module 600 on top of the printer module 400, and the scanner module 200, which is shown in FIG. 6, on top of the system control module 600.

The scanner module 200 includes, referring to FIGS. 3 and 6, at least an image scanner (202–207, 250) which reads an original image and resolves the image into a picture element, a scanner controller 230 which includes a first communication unit SCSI, and an electric source circuit 201.

A basic image process circuit 300 and an extended image process circuit 350 may be added as required. The image scanner (202–207,250) includes a color imaging device 207 which converts a color image into a signal for each color component and an analog-to-digital converter (hereinafter referred to as an A/D converter) 252 which converts a signal for each color component to digital data.

The printer module 400 includes, referring to FIGS. 5 and 7, an image forming device 400img which forms a visible image on a recording media 190 (A and B), which is fed out from a paper feeding plate 412B, and exits the same recording media from the apparatus, and a printer controller 430 which includes a second communication unit SCSI and an electric source circuit 401. The image forming device 400img includes a series of devices which are generally employed in an electrophotography for forming an image, such as a photoconductor 414, a charger 419, a laser exposure device 441, a developing device 420, a first transfer device 416, an intermediate image transfer belt 415, a second transfer device 427, and so on.

The system control module 600 includes, referring to FIGS. 4 and 7, a system controller 630 which includes a third communication unit SCSI. The system controller 630 controls the scanner module 200 for image scanning and the printer module 400 for image formation.

These three modules 200,400 and 600 are so made to function properly as a system even when placed separated from each other as shown in FIGS. 6 and 7. For example, in a case that these modules are combined so as to function as a copying machine, the scanner module 200 is packaged and shipped from a factory in a single package, and the system control module 600 and the printer module 400, the former being mounted and fixed on top of the latter, are packaged and shipped in the same package, for accomplishing both reduction of weight of one package and easiness in putting the modules together.

Further, there have been made various considerations to these modules 200, 400 and 600 for providing, when combined together, easy operation, aesthetic appearance and minimum space occupancy, and minimizing noise and heat emission, electromagnetic wave emission and mechanical sympathetic vibrations. For example, for functioning as a copying machine, the three modules 200,400 and 600, and a table or the multiple paper feeders unit 480 (FIG. 8) are generally combined. Therefore, these three modules are so made to be placed vertically on top of one another for minimizing floor space occupancy. Further, the height of each module is so made that, when so placed, the height of a platen of the scanner module 200 from the floor becomes between 900 mm and 1100 mm for providing easy and efficient operability for an original document placement on the apparatus. Various keys and buttons for operation are placed on the surface of the platen or a place which is below the surface of the platen for accomplishing easy and reliable operation.

A projecting shape of each plane of the three modules, which comes in contact with another module when placed on top of one another, is so made to be almost identical for avoiding unshapeliness as a whole when combined and also for preventing a module placed on top of another from falling off. Further, a number of cables for connection is minimized from an aesthetic view point and also for minimizing electromagnetic wave emission, and terminals of each module, which are connected with each other, are placed respectively in such locations to make a length of the cables for connection as short as possible. Further, in a case that only a copying function is required, the system control module 600 may be made very compact in size and may be incorporated in a part of the scanner module 200, the printer module 400 or optional modules, and in such a case, the above-mentioned considerations are required to be made only for a combination of the module 200 and the module 400.

Hereinafter, the structure and functions of each module are explained in detail.

First, the scanner module 200 is explained referring to FIGS. 3, 6 and 9–11.

In the scanner module 200 which is shown in FIGS. 3 and 6, the scanner controller 230 is mounted on an electric circuit board and a prescribed voltage is applied thereto from an electric source circuit 201. And, a commercial electric voltage (or a direct current voltage) is applied to the electric source circuit 201 via an electric source plug 201P. In the drawings, numeral 201SW denotes an electric source switch, numeral 202 denotes a platen glass for placing thereon an original document, numeral 202S denotes a base position for placing the leading edge of an original image, numeral 202SH denotes a white board for shading correction, numeral 202B denotes a bar code board for recognizing an illegal copy and an identification number of an apparatus, numeral 208 denotes a first carriage, numeral 209 denotes a second carriage, numeral 203 denotes a lamp for lighting an original document, numerals 204A, 204B and 204C denote respectively a first, a second and a third mirror, numeral 205 denotes an image forming lens, numeral 205X denotes an optical axis of the lens, numeral 207 denotes a color imaging device, numeral 211 denotes a sensor for sensing a home position for the carriages, S1 and S2 denote respectively a SCSI connector having the same shape and the same interface and mounted on the electric circuit board for the scanner controller 230. F1 and F2 denote respectively an optical fiber connector for communicating with additional units which are connected optionally to the scanner module 200.

An image reading circuit 250, a basic image process circuit 300 and an extended image process circuit 350 are mounted respectively on an electric circuit board and included in a housing for the scanner module 200.

The scanner controller 230 includes, as shown in FIG. 3, a micro processor CPU, a read/write memory RAM, a read only memory ROM, an interrupt controller INT, an input/output circuit DV for sensors and actuators, a serial communication unit PF, a first synchronous signal generator SYNC, a first crystal oscillator XTL, a DMA controller DMA, a first-in-first-out memory FIFO, a first communication unit SCSI which includes a SCSI controller, a bus BUS and an image data channel DC.

Figure 9:
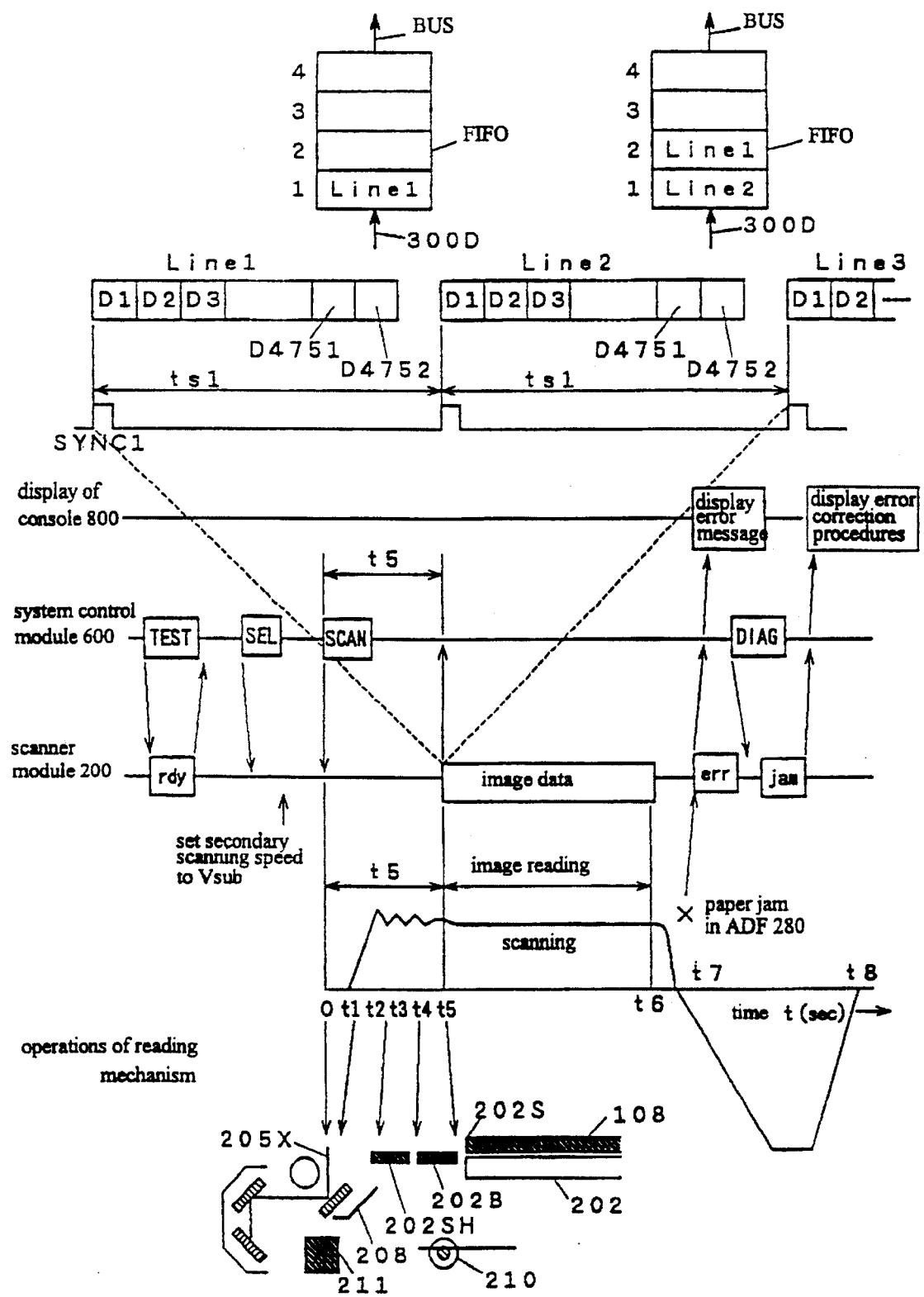
FIG. 9 is a time chart illustrating an outline of operational timing of the scanner module, the system control module and an image reading device of the scanner module.

Next, a scanning control function of the scanner controller 230 is explained referring to FIG. 9.

The scanner controller 230 controls image reading, communicates with the system control module 600 or the printer module 400 with a prescribed protocol and in accordance with the instruction therefrom, and outputs image data for an original document which is read. Further, the scanner controller 230 integrally controls all devices in the scanner module 200 and additional units, such as the automatic document feeder 280 and so on, which are connected optionally.

Generally, in an image processing system including a scanner and a printer, which are physically separated, such as an optical image filing system, for example, a page buffer memory is provided in some way or other between these units. In this kind of configuration, however, there occurs inevitably a time lag between image reading by the scanner and image formation by the printer. In a case of a copying machine, such a time lag increases a first copy time, which is not desirable.

In this embodiment, a page buffer memory is eliminated for saving cost, and further, image reading by the scanner module 200 and image formation by the printer module 400 are synchronized and performed almost without a time lag, for avoiding such a first copy time problem. In order to accomplish such synchronization of image reading and image formation, an image reading cycle and an image forming cycle therefore need to be synchronized, and further, leading edges of an image in image reading and image formation need to be registered. In a case that synchronization between an image reading cycle and an image forming cycle is not met, there occurs a result that a copy image produced is shrunk or stretched. In a case that the leading edges of an image in image reading and image formation are not registered, there occurs a result that a copy image is not reproduced at a corresponding position on a recording sheet correctly.

Further, in this embodiment, the printer module 400 employs a sequential color development method to form an image of each color (c, M, Y and K) in sequence, superposing one image on another. In a color image forming apparatus which employs this type of a printer, it is wise to eliminate a page buffer memory for reducing cost, and instead perform image scanning for an original document four times in total, sending image data for one of C, M, Y and K in each of the four times of scanning. However, in such a case, it becomes very important to secure a precise registration of a scanning start position for each scanning. In a case that such a registration is not met, there occurs a result that an image of each color is not superposed on another correctly, and consequently that a full color image is not reproduced correctly.

Now, how the leading edges of an image in image reading and image forming are registered is explained referring to FIG. 9.

FIG. 9 illustrates image scanning for one color, and in the upper half portion is shown details of scanning for two lines in a primary scanning direction.

First, when a SCAN command is received by the scanner module 200 from the system control module 600, the first carriage 208 starts to travel and reaches, always after a lapse of a time t5 after receipt of the SCAN command, to a position where the optical axis 205X reaches the leading edge position 202S for an original document, and a scanning speed in a secondary scanning direction is prescribed to Vsub. Thus, image data is outputted always after a lapse of a fixed time t5 after receipt of a SCAN command by the scanner module 200, and as a result, registration of leading edges of an image in image reading and image formation is secured. Further, a carriage home position sensor 211 is provided for correcting a home position of the carriage for each scanning, and a moving distance of the first carriage 208 to the secondary scanning direction with one step of a stepping motor 210 is kept to below 1/16 mm. For driving the motor, a micro step driving method is employed.

For achieving synchronization of an image reading cycle and an image formation cycle, the scanner module 200 reads one line of primary scanning, synchronizing with a pulse line cycle ts1 which is generated by the first synchronous signal generator SYNC (FIG. 3), and inputs the data into an output FIFO buffer, and the receiver side of the data, which is the system module 600 in this case, receives the data in sequence at the same cycle as the pulse line cycle ts1. In a case of a copying mode, the printer module 400 becomes the receiver side of the data and such synchronization is kept by the printer module 400. Thus, image data of an original image is obtained always after a certain time after receipt of a command even when image scanning is performed in any number of times, and leading edges of an image in image scanning and image formation are always registered correctly. Further, registration for each color in a color copying mode is accomplished without requiring a buffer memory, and consequently, a problem of a long first copy time is eliminated. The scanner module 200 receives a SCAN command from the other two modules, the system control module 600 and the printer module 400.

Figure 10:
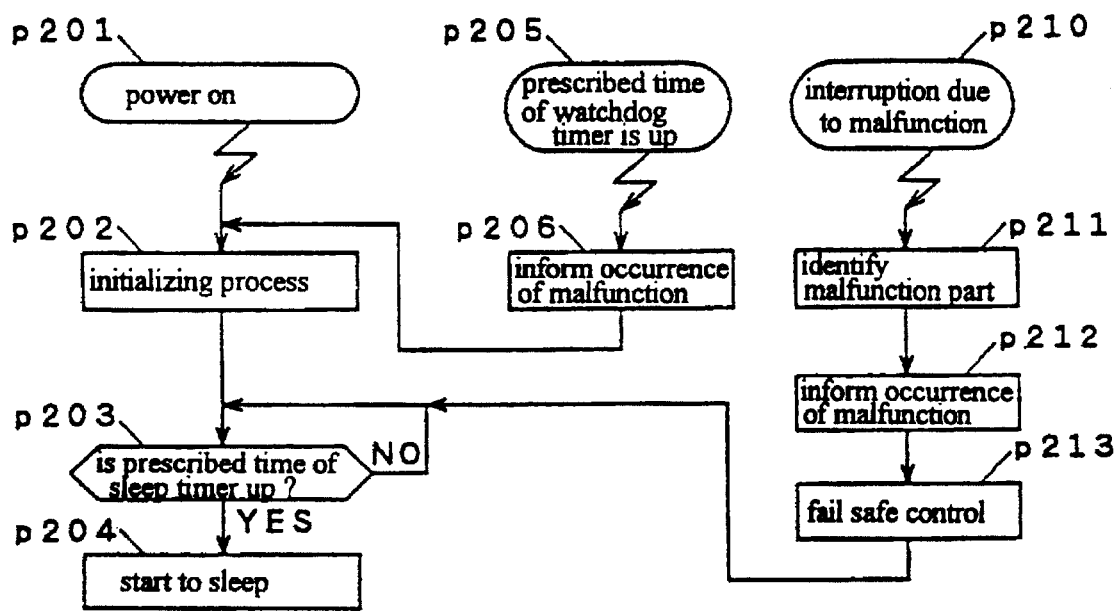
FIG. 10 is a flowchart illustrating processing functions of the scanner controller.
Figure 11:
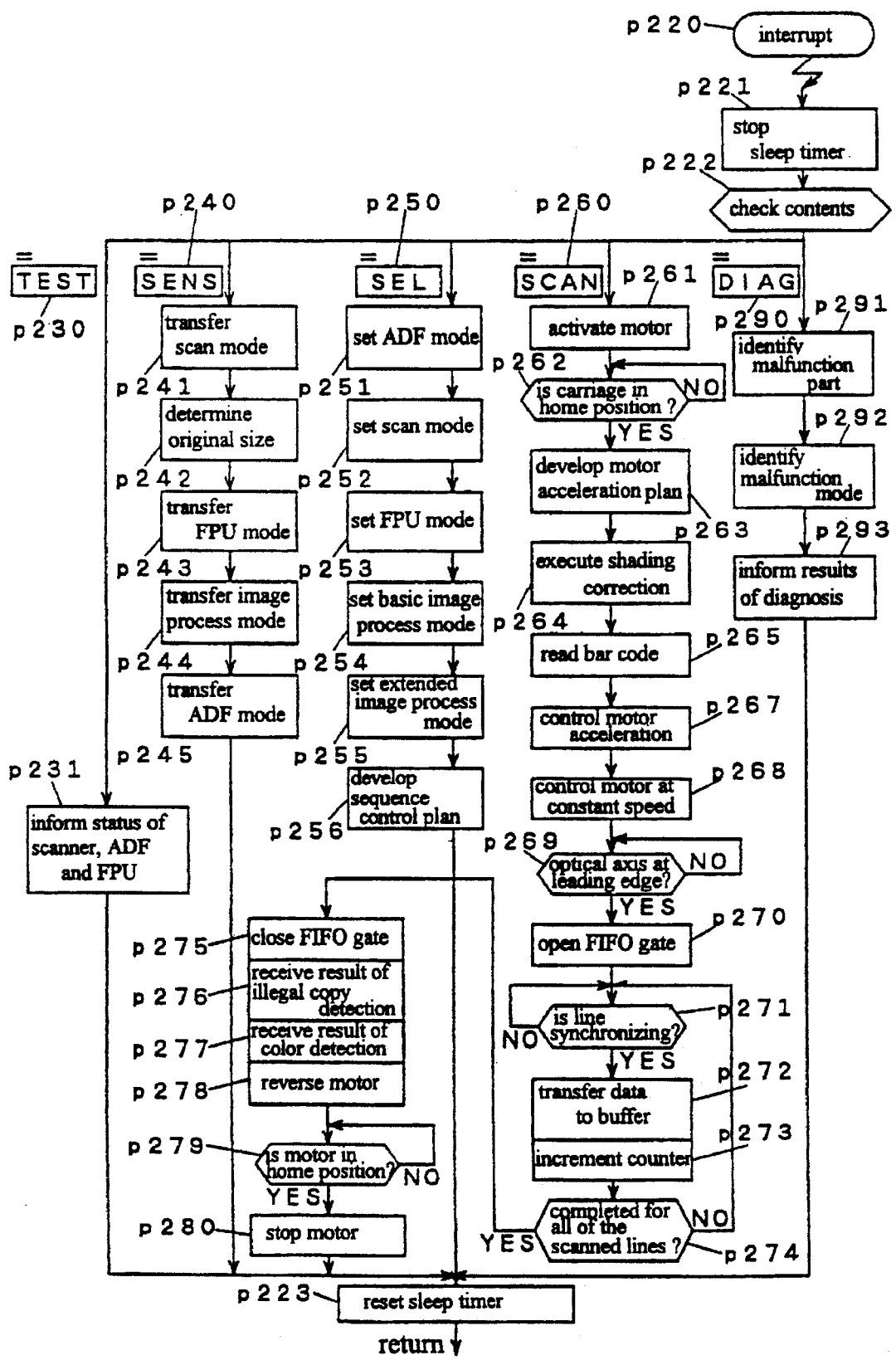
FIG. 11 is another flowchart illustrating processing functions of the scanner module.

FIGS. 10 and 11 are flowcharts showing processing functions of the scanner controller 230. These functions are performed through execution of programs by the CPU in the scanner controller 230. An executing program is stored in the read only memory ROM of the scanner controller 230. Referring now to FIG. 10, the CPU performs an initializing process p202 when a power is made on (p201). This initializing process p202 prescribes an initial parameter for each circuit element, and an initial position for a watchdog timer and the carriage 208. A process p203 waits for a command input from the terminals S1 and S2 and checks if a prescribed time (for a time-out) is elapsed. In a case that the prescribed time is elapsed without a command input, a process p204 puts off a power for the image reading circuit 250 and lowers the voltage for the image process circuit 300 and the extended image process circuit 350 to a minimum level for holding data in the registers in the circuits. This process contributes to a reduction of electric consumption and a lowering of noise which is generated by a cooling fan.

When the watchdog timer leaves from normal operation of a program, a process p206 informs the system module 600 of an occurrence of a malfunction. When some trouble occurs in the image reading circuit 250, the image process circuit 300 or the extended image process circuit 350 (p210), a process P211 identifies a malfunctioning part, analyzes the cause of the malfunction and a process p212 informs the system control module 600 of the results of such identification and analysis. A process P213 performs a fail-safe processing for avoiding danger, such as fire, for example, when the motor 210 is overheated.

When some information input is made to the SCSI terminal S1 or S2 (p220), a process p221 stops a sleep timer. A process p222 examines the contents of the input and the process branches out to one of five paths. A process p230 (TEST) is a path in a case that a request is made for examining if the scanner module 200 is in a condition of being capable of scanning, and a process p231 informs the conditions of the scanner module 200 including the conditions of the automatic document feeder 230 and the film projector 290 which are connected to the scanner module 200 optionally. A process p290 (DIAG) is a path in a case that a request for diagnosis is made to the scanner module 200. Most typically, such a request is made when an occurrence of a malfunction is informed by the process p205 or the process p212, and processes p291 through p293 perform a diagnosis process and a notification process.

A process p240 (SENS) is a path in a case that a request for examining various modes conditions is made, and processes p241–p245 notify the scanning mode of the scanner module 200, which are currently prescribed, including those of the automatic document feeder 280 and the film projector 290.

A process p250 (SEL) is a path in a case that a request for a mode selection is made, and processes p251–p256 prescribe parameters for various modes. A process p260 (SCAN) is a path in a case that a request for a SCAN or a COPY is made, and normally, such a request is made one time for one original document in cases of a mono color copy processing and a color copy processing in a RGB processing mode, and four times in sequence for one original document in a case of a color copy processing in a CMYK processing mode. When this request is made, a process p261 activates a motor 210, and then, a process p262 determines if the carriage 208 has passed the carriage home position sensor 211 and performs a correction operation for resetting a position counter which is provided in the RAM. This position counter is incremented by one in accordance with a synchronous pulse which is generated by the first synchronous signal generator SYNC for each scanning line. A process p263 calculates a driving plan (a timing plan for driving control) for the motor 210 to move the first carriage 208 to reach to a position where the optical axis 205 arrives the leading edge position 202S of an original image after an elapse of a time t5 after receipt of a SCAN command or a COPY command, and further, for the motor 210 to reach to a state to revolve at a scanning speed Vsub, which is prescribed in accordance with a request for a mode prescription. A process p264 reads the base white plate 202SH for calculating and prescribing a shading correction parameter, which is used later in shading correction for image data.

A process p265 reads the bar code 202B, a process p267 controls acceleration of the motor, and a process p268 changes the control of the motor to a fixed speed control when the speed reaches a prescribed speed. A process p269 monitors if the value of the position counter reaches a value indicating that the first carriage 208 has reached a position where the optical axis 205 arrives at the leading edge position 202S of an original document, and moves to a process p270 when reached. The process p270 opens an entry gate of the FIFO which is a buffer memory for image data and prepares for receiving an image signal from the basic image process circuit 300 through an image signal line 300D.

Processes from p271 through p274 are a series of task for outputting image data into the FIFO. First, a process p271 detects a synchronous pulse which is generated by the first synchronous signal generator SYNC for each scanning. A process p272 stores image data for 4752 picture elements, which is the data from scanning for one line, to the FIFO through the image signal line 300D. A process p273 increments by one the home position counter for the carriage. A process p274 checks if this loop from p271 to p274 is repeated for a number of times corresponding to a number of scanning lines, for example, for 6720 times which corresponds to scanning lines of 6720 in a case of an A3 size. When scanning for a whole page is completed, a process p275 closes an entry gate of the FIFO, a process p276 receives a result of detection from a special original detecting circuit 500 (FIG. 3) and a process p277 receives a result of detection from a color original detecting circuit 320 (FIG. 3). These exchange of information are made through the BUS. Next, a process p278 drives the motor in a reverse direction, a process p279 detects the home position, and a process p280 stops rotation of the motor 210. A process p223 resets the sleep timer.

Next, a structure of the image scanner (202–207, 250) is explained referring to FIG. 3.

In FIG. 3, numeral 207 denotes a color imaging device, numeral 252 in the image reading circuit 250 denotes an analog/digital converter, numeral 253 denotes a shading correction circuit, and numeral 254 denotes a sampling position correction circuit. An original document 180 is placed on a platen 202 so that the surface for copying faces downward and the edge portion of the original document from which reading starts is placed registering with a left-side edge of the platen, which is the leading edge position 202S for an original document. An imaging lens 205 projects and forms a reduced image of an original document on the light receiving plane of the imaging device 207. The imaging device 207 is a charge-coupled device (CCD) capable of color imaging, and includes a R imaging part in which 4752 picture elements, which are covered by a red color filter, are arranged unidimentionally, a G imaging part in which 4752 picture elements, which are covered by a green color filter, are arranged unidimentionally, and a B imaging part in which 4752 picture elements, which are covered by a blue color filter, are arranged unidementionally. These imaging parts are arranged in parallel with each other in the direction of primary scanning. The imaging parts in three rows almost adjoin each other, and a distance among each other is 4/16 mm calculated in terms of an original document 180. A direction to which this unidementionally arranged imaging device scans is herein referred to as a primary scanning direction and a direction which is at a right angle to the primary scanning direction is herein referred to as a secondary scanning direction. A lighting lamp 203 and a first mirror 204A are mounted on the first carriage 208 and a second mirror 204B and a third mirror 204C are fixed on the second carriage 209.

When reading the original document 180, the first carriage 208 is driven at a speed of a secondary scanning speed Vsub and the second carriage 209 is driven at a speed of Vsub/2, both in a direction of a secondary scanning from the left side edge to the right side edge of the platen 202 by an original document scanning motor 210 and a driving wire 210W, maintaining an optical cooperative relationship between these two carriages. A stepping motor is employed for the motor 210. The secondary scanning speed Vsub is variable at a step of 1% of the base speed from 1/8 to 4 times of the base speed, and a speed is selected by a selection command (for a magnification ratio) from another module.

Next, functions of the image scanner (202–207, 250) are explained referring to FIG. 9 which is a time chart showing image scanning timing of the image reading structure (203–207 in FIG. 6). The first carriage 208 normally stands still and is ready right above the carriage home position sensor 211, and the sensor output is ON. When an instruction for scanning SCAN or REQ is received by the scanner module 200, the lamp 203 is lighted at a position of t1 and the motor 210 starts to drive the carriage 208 to a direction to the right. After a lapse of a time of t2, the carriage 208 leaves from an area detectable by the carriage home position sensor 211, and the output from the sensor becomes OFF. The position where the carriage 208 leaves from the area detectable by the sensor 211 is stored as a scanning start position and is used as a base position for correcting a start position for secondary scanning. Further, the scanner controller 230 calculates a driving plan (a timing plan for driving control) for the motor 210 to move the first carriage 208 to reach a position where the optical axis 205 arrives the leading edge position 202S for an original image after a lapse of a time t5 after receipt of a SCAN command or a COPY command, and further, for the motor 210 to reach a state to revolve at a scanning speed Vsub which is prescribed in accordance with a request for a mode prescription, and produces a stepping pulse row for the motor 210. Then, the carriage 208 is driven at the speed controlled in accordance with this pulse row, and consequently, the time for the carriage 208 to reach a position where the optical axis 205X arrives at the leading edge position 202S of an original image is met, and further, scanning at a prescribed speed is accomplished as planned. After the first carriage 208 passes the base position for correcting the secondary scanning start position, the imaging device 207 reads an image of each color, which is projected through the lens 205, in a unit of one line of the primary scanning, regardless of the secondary scanning speed. Therefore, a time for storing an electric charge in the imaging device 207 may be made to a certain fixed time. A cycle of the primary scanning corresponds to a pulse row cycle ts1 which is generated by the first synchronous signal generator SYNC, and the same pulse row is connected to the image reading circuit 250 via the BUS. The first synchronous signal generator SYNC downcounts the original frequency of a crystal oscillator XTL, which is connected thereto, and outputs to the BUS. The total number of the picture elements of the imaging device 207 is 4752, and the device resolves one line of the primary scanning to 16 picture elements per one millimeter in terms of an original image, reads sampled elements and outputs an analog voltage which corresponds to RGB light for each picture element reflecting from the original image 180. The analog signal is then converted by the A/D converter 252 to a digital signal in 8 bits (R, G and B image data), namely, to 256 steps of tones, and is outputted to the shading correction circuit 253.

After the carriage 208 passes the base position for correcting the secondary scanning start position, the image reading structure reads the white board 202SH for shading correction, and the resulting digital value in 8 bits is stored in the shading correction circuit 253. Then, shading correction becomes applicable to image data which is obtained thereafter. When the carriage 208 passes at a time t4 under the bar code board 202B for recognizing an illegal copy, such as a copy of securities, and identification of the apparatus for performing remote service, the image reading structure reads the bar code and the image data is sent to the system control module 600. When the carriage 208 reaches a position where the optical axis 205X arrives at the leading edge position 202S of an original image at a time t5, the image reading circuit 250 reads the original image 180 in units of one scanning line, and outputs digital data 250D for each picture element in sequence to the basic image process circuit 300. When the whole plane of an A3 size original image 180, which corresponds to 6720 scanning lines in total, is read, the carriage 208 reaches the right side edge of the platen, and when a time reaches t6, the motor 210 rotates to a reverse direction and the carriage 208 returns to the home position 211 to wait for a next scanning operation.

Next, the basic image process circuit 300 is explained referring to FIG. 3. In FIG. 3, numeral 301 denotes a space filter circuit, numeral 302 denotes a reduce/enlarge circuit, numeral 303 denotes a color process circuit 303, numeral 304 denotes a gray scale process circuit, numeral 310 denotes an auto gray scale image separation circuit, numeral 320 denotes an automatic color image detect circuit and numeral 500 denotes a special original detect circuit.

The space filter circuit 301 performs a smoothing process or an edge sharpness enhancing process. Generally, the smoothing process is applied when an image of an original document 180 is a gray scale image and the edge sharpness enhancing process is applied in a case that an image contains character images only. A selection of these processes is made by an input by a user via an original document selection page which is displayed in a display of a console 800 or in accordance with the result of gray scale image separation by the gray scale image separation circuit 310. The reduce/enlarge circuit 302 reduces or enlarges an image by a ratio between 25% and 400% in the primary scanning direction. Reduction and enlargement in the secondary scanning direction is accomplished by changing an image reading speed (secondary scanning speed).

The color process circuit 303 provides a masking process to RGB signals (R, G and B image data) and changes the signals to image recording signals, which are image data for recording cyan, magenta, yellow and black (C, M, Y and K). Further, the circuit applies to the image recording signal for each color adaptive color processes which are suitable for a character image and a gray scale image respectively, such as, for example, a blackening process for a character image in black color. The circuit further outputs the RGB signals as they are, as required, to the system control module 600 through the scanner controller 230. The gray scale process circuit 304 produces an image recording signal in 4 bits, applying a dither process to one of the image recording signals for C, M, Y and K in 8 bits. The circuit further applies to the image recording signal adaptive gray scale processes which are suitable for a character image and a gray scale image respectively. The gray scale image separation circuit 310 recognizes a character image portion and a gray scale image portion respectively in an original image and outputs the result to the space filter circuit 301, the color process circuit 303 and the gray scale process circuit 304. The automatic color image detect circuit 320 performs a recognition process for recognizing if an original image is a color image or a black-and-white image. The special original detect circuit 500 detects if an original document 180 is a type of an original document whose copy is prohibited legally, such as, securities. When such an original document whose copy is prohibited is detected, the image signal is so changed to produce a copy whose surface is entirely black. The special original detect circuit 500 includes n number of a background characteristics comparison circuit, a color characteristics detect circuit, a special mark detect circuit, a special character row detect circuit and a logic circuit which produces the logical sum of the result of these detection, operations and detects an original image whose copy is prohibited and informs the gray scale process circuit 304 when such an image is detected. The gray scale process circuit 304 then converts the image to one whose entire surface is black. The background characteristics detect circuit, the color characteristics detect circuit and the special mark detect circuit are selectable in any combination in accordance with a requirement of a country where the apparatus is used.

Next, functions of the basic image process circuit 300 are explained referring to FIG. 3.

RGB image data for an original image are inputted in parallel to the space filter circuit 301, the gray scale image separation circuit 310, the automatic color original detect circuit 320 and the special original detect circuit 500 and are processed in parallel. Functions of the basic image process circuit 300 are divided into two categories. Functions which come within one category are those for helping a user to manipulate an image, such as a gray scale image separation for recognizing a character image and a gray scale image separately, an original document size detection and a color original detection. For some of the functions in this category, for example, a color original detection, it is required to examine the whole part of an original document placed on the platen 202, and in such a case, preliminary scanning is performed prior to scanning for image formation.

Functions which come within the other category are those for processing an image signal, such as space filtering, enlargement and reduction, trimming, image shifting, color correction, gray scale conversion and so on. These functions are further categorized to those which are common to all kinds of images, such as, enlargement and reduction, for example, and to those which are not common to all kind of images, such as, gray scale conversion.

A majority of the results of the processing in the first category are informed to the system control module 600, and upon receiving these results, the system control module 600 sends corresponding commands to other modules to perform image formation accordingly.

For example, when the basic image process circuit 300 detects that an original document is black and white, the circuit 300 informs the results to the scanner controller 230, the first communication unit SCSI informs the results to the system control module 600, and the system control module 600 sends to the printer module 400 a command to activate K development and disable C, M and Y development. Then, the printer controller 430 in the printer module 400 activates only the K developing unit 420K and stops development for other colors, thus forming an image in an efficient manner.

Image processing functions in the second category are further categorized to a group of those which are automatically selected in accordance with the results of the processes in the first category, a group of those which are inputted by an operator from the console 800 (FIG. 7) and a group of those which are a combination of functions in the first and second groups. A specific color image elimination is one example of such functions, and is a process to eliminate a specific color from an original image, reserving other colors, for forming an image excluding such a color on a copy sheet 190A. Elimination of a specific color is accomplished in a color conversion process by a color process circuit which is included in the basic image process circuit 300. A specific color is inputted by an operator through the console 800. In a copy mode, RGB image signals which are inputted into the basic image process circuit 300 are converted to image recording signals, C, M, Y and K, and are then given to the printer module 400. When an original image is detected as a black and white image, or a command for a black monochrome processing is received, a monochrome process is applied and color signals other than for K are not outputted. Next, the extended image process circuit 350 is explained referring to FIG. 3.

The extended image process circuit 350 is made of two circuits, which are shown in FIG. 3, a specified area process circuit 351 and an image edit circuit 352. The extended image process circuit 350, which is a printed circuit board, is provided in the outer side of the scanner module 200, so that the circuit can be added depending upon a requirement of a user.

The specified area process circuit 351 applies to a specific part of an original document, which is specified by an operator, image processing, which is different from the one applied to the other parts of the original document. The image edit circuit 352 performs various special image editing functions, such as, right and left reversing, mosaicking, solarrization, posterization, contrast enhancement and so on. An image trimming process, which is one of the specified area processing, is a process to copy a specific part of an original image and delete all of the other parts. A well-known technology as shown in Tokukaisho 62-159570 is employed for such a process. However, there is a problem in this technology that an original document needs to be marked by a felt pen for specifying an area to be copied. In this embodiment, for avoiding putting a mark on an original document, an original document is scanned and the image is displayed on a display 820 in the console 800 (FIG. 7). Then, an operator specifies an area to be trimmed, viewing a displayed image and by use of a cursor move key and an enter key, and the area thus specified is deleted by the specified area process circuit 351.

Next, structures of the printer module 400 are explained referring to FIGS. 5 and 7.

The printer module 400 includes the image forming device 400 img, the printer controller 430 including the second communication unit SCSI, the electric source circuit 401 and optional devices, such as the multiple paper feeders unit 480 and the sorter 490. The image forming device 400 img includes various elements for image formation, such as, a photoconductor 414, a charger 419, a laser exposure 441, a developing unit 420, a first transfer unit 416 and a second transfer unit 417.

The printer controller 430 is mounted on a printed circuit board and a prescribed voltage is applied thereto from the electric source circuit 401. A commercial voltage is applied to the electric source circuit 401 via a commercial electric source plug 401P and a power switch 401SW (FIG. 7). S1 and S2 denote respectively a SCSI connector which is mounted on the printer controller 430 and has the same shape and the same interface. F1 and F2 denote respectively an optical fiber connector for communicating with the optional devices, the multiple paper feeder unit 480 and the sorter 490. Numeral 441 denotes a laser diode, numeral 442 denote a f θ lens, numeral 443 denotes a revolving polygon mirror, numeral 444 denotes a mirror, numeral 412A denotes a paper feeding cassette for duplex copying, numeral 412B denotes a manual paper feeding tray, numerals 413A and 413B denote respectively a paper feeding roller, numeral 418R denotes a pair of registration rollers, numerals 413F, 413G, 413H and 413J denote respectively a pair of paper feeding rollers, numeral 414 denotes a photoconductor drum, numeral 415 denotes an intermediate image transfer belt, numeral 416 denotes a first transfer device, numeral 417 denotes a second transfer device, numeral 419 denotes a charging scorotron, numerals 420C, 420M, 420Y and 420K denote respectively a developing unit for cyan, yellow, magenta and black, numeral 420 denotes an assemblage of developing units, numeral 421 denotes a cleaner, numeral 422 denotes a feeding belt, numeral 423A denotes a fixing roller, numeral 423B denotes a back-up fixing roller, numeral 424 denotes a paper exiting roller, numeral 425 denotes a deflecting roller and numeral 426 denotes a leading edge sensor for an image.

The printer controller 430 includes, as shown in FIG. 5, a micro processor CPU, a read/write memory RAM, a read only memory ROM, an interrupt controller INT, a serial communication unit PF, a second synchronous signal generator SYNC, a second crystal oscillator XTL, a DMA controller DMA, a first-in-first-out memory FIFO, a second communication unit SCSI which includes a SCSI controller, SCSI connectors S1 and S2, an input/output circuit DV for various actuators, such as a sensor and a motor, a bus BUS and an image data channel DC.

Figure 12:
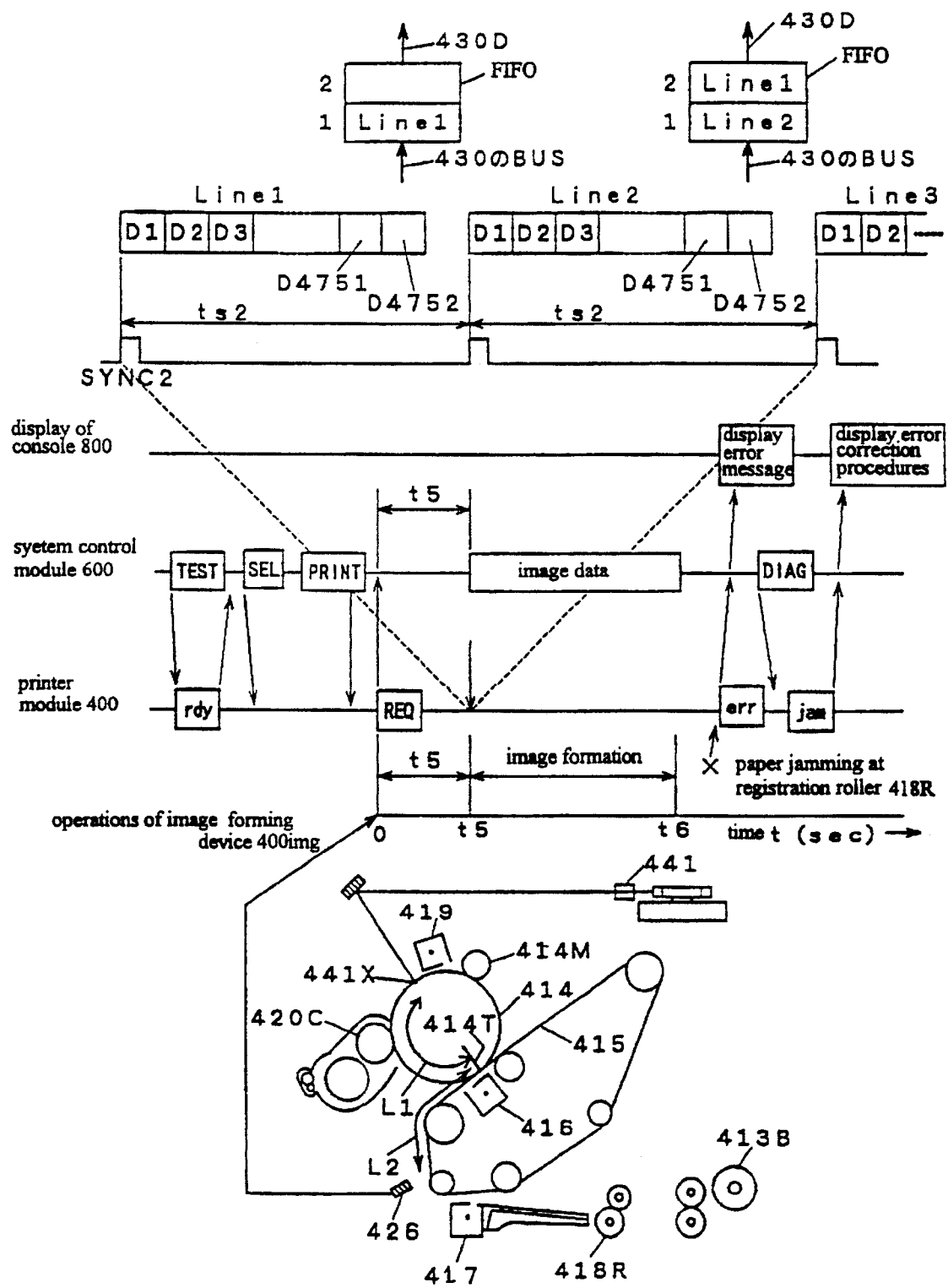
FIG. 12 is a time chart illustrating operational timing of the printer module, the system control module and an image forming device of the printer module.

Next, timing control and synchronous control by the printer controller 430 are explained referring to FIG. 12.

The printer controller 430, communicating with the system control module 600 or the scanner module 200 with a prescribed protocol, obtains image data in a unit of primary scanning for one line and activates the elements of the image forming device in the printer module 400 to form an image and output a copy which carries the final image 190B. Further, the printer controller 430 controls integrally the multiple paper feeder unit 480 and the sorter 490 which are connected optionally to the printer module 400. In a case that an image forming mode is prescribed to a full color mode, the printer controller 430 performs a sequential color development, in which an image for each of C, M, Y and K is formed in sequence, superposed with each other on the intermediate image transfer belt 415, and then transferred to the recording sheet 190A to form thereupon the final image 190B. Therefore, in a full color mode, the printer controller 430 outputs a scanning request (a request for image data for each color) four times to the system control module 600 or the scanner module 200 for producing one sheet of a copy or a print in full color.

In a process of forming a color image, accuracy in the registration of an image of each of C, M, Y and K on the intermediate transfer belt 415 is very important for forming a final image correctly in full color.

How such accuracy in the registration is accomplished is explained next referring to FIG. 12.

FIG. 12 is a time chart illustrating synchronization of an image signal for one color, and indicates that the printer controller 430 sends to the system control module 600 or the scanner module 200 a data request command REQ a given time t5 before receiving image data. In a case of a color image, the printer controller 430 sends a data request command REQ for the second color a given time t5 before the position on the surface of the photoconductor drum 414, where the leading edge of an image of the preceding color was located, reaches an exposure point 441X (FIG. 12). For measuring accurately a time for such a part of the photoconductor drum 414 to reach the exposure point 441X, the leading edge sensor 426 for an image is provided facing the intermediate transfer belt 415, and, the sum of a distance L1, which is a distance from the exposure point 441X to a first transfer point 414t, and the product of a revolving speed Vpc of the photoconductor drum 414 and a time t5 is made as equal to a distance L2, which is from the first transfer point 414T to a detecting position of the leading edge sensor 426. And, for image formation of second and following colors, the printer controller 430 outputs a data request command REQ when the sensor 426 detects the leading edge of an image of the preceding color.

Such a method to output a data request command before a given time as explained above is very effective in a case that the other party to which a data request command is sent is a type of equipment, such as the scanner module 200, whose scanning device has certain mass and requires a certain time before outputting image data. If the printer controller 430 outputs a data request command REQ as explained above, the scanner module 200, which is the data outputting side, prepares image data for the first line of the primary scanning after a time of t5 in accordance with a communication protocol between the modules. Thus, registration of the leading edges of images of C, M, Y and K are accomplished.

Further, in order to accomplish registration of an image with a recording sheet, the printer controller 430 receives from the other party (a scanner or a host) recording data for one line of the primary scanning synchronizing with a pulse row cycle ts2 which is generated by the second synchronous signal generator SYNC and inputs the data into a receiving buffer FIFO. The printer controller 430 activates the polygon mirror 442 to be driven by a servo motor which is controlled by a phase-locked loop circuit, synchronizing with the pulse row cycle ts2, and the mirror surface is exchanged (a line is exchanged) at a cycle of ts2. Consequently, the exposure point 441X of the laser 441 scans and exposes the surface of the photoconductor drum 414 at a cycle of ts2. During such a scanning and exposing cycle, a laser driving circuit 441DV lights the laser 441 4752 times for each picture element in accordance with image data D1 through D4752 which are the data for one line of the primary scanning. A data transmitting side is the scanner module 200 in a copy mode and the system control module 600 in a print mode, and synchronization as mentioned above is maintained with these modules.

Thus, the printer controller 430 receives recording data always after a certain time after receipt of a request command regardless of a number of times of scanning, and an image of an original document for each of C, M, Y and K is registered correctly on a recording sheet, consequently producing an image in full color correctly.

Further, an interval for forming an image of each color is made variable in this embodiment. In a case of a color copy mode for an A4 size image, an image of one color is formed at one revolution cycle of the intermediate transfer belt 415, and in a case of an A3 size color copy, an image of one color is formed at a cycle of 2 times of the revolution of the intermediate transfer belt 415, thereby securing sufficient time for preparation for another color, such as, for example, a time for rotating the developing units assemblage 420 accordingly.

Further, in a case of a color print mode for receiving recording image data from a module other than the scanner module 200, an arbitrary interval can be inserted after completion of image formation for one color, regardless of the size of an image, in this embodiment. Because of this feature, even though the capacity of a data memory for image data, such as a RAM in the system controller 630, is limited, or the CPU is of regular power, the print processor PR of an application processor 650 converts image data for each color to bit-mapped data without being restricted by a time, and the system control module 600 transfers to the printer module 400 image data for a color when the data for that color is completed, so that the printer module 400 forms an image of that color.

Figure 13:
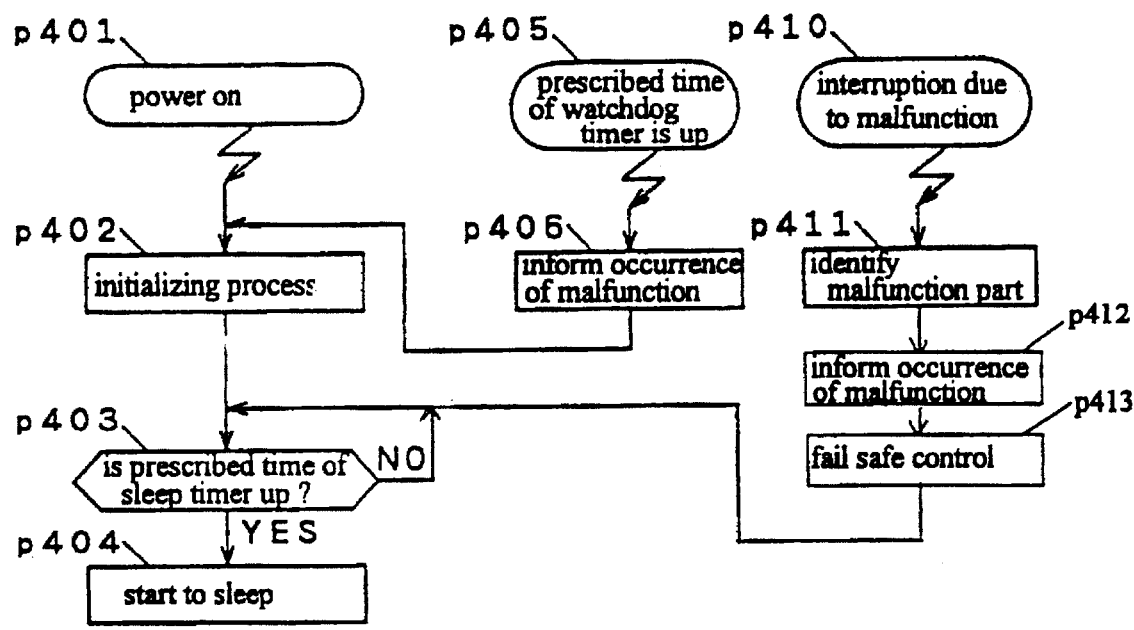
FIG. 13 is a flowchart illustrating processing functions of the printer controller.
Figure 14:
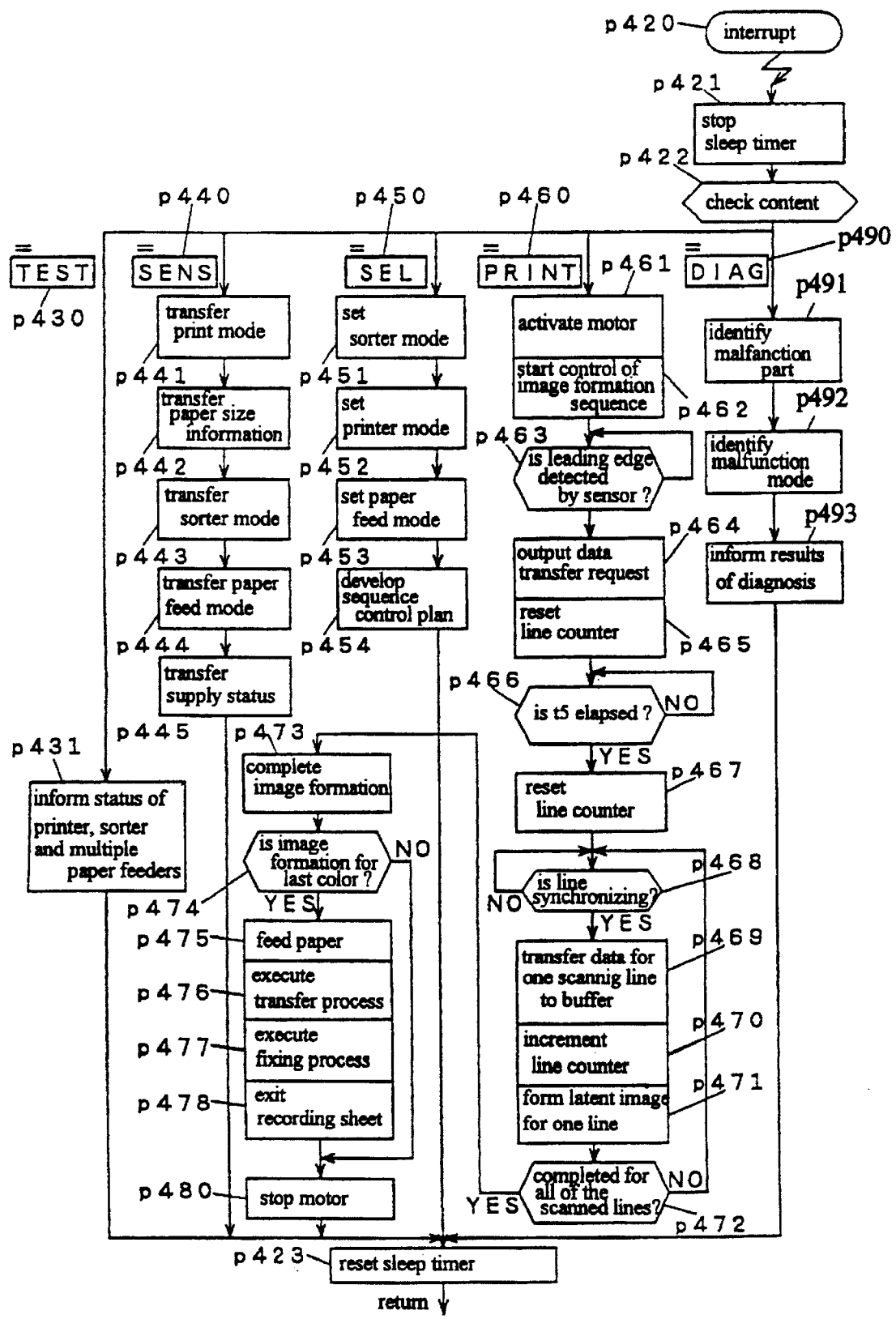
FIG. 14 is another flowchart illustrating processing functions of the printer controller.

FIGS. 13 and 14 are flowcharts showing processing functions of the printer controller 430, which are performed by execution of a program by the CPU in the printer controller 430. An executing program is stored in the read only memory ROM.

Referring now to FIG. 13, when a power is turned on (p401), a process p402 performs various initializing processes, such as, for example, prescriptions for an initial parameter for each circuit element, and start of the watchdog timer and initial positioning of the developing units assemblage 420. A process p403 checks if a command input from the terminals S1 and S2 are made within a prescribed time. In a case that the prescribed time is elapsed without a command input, a process p404 turns off a power for a heater of the fixing unit 423. This process contributes to reduction of electric consumption of the apparatus while the apparatus is in a waiting state. When the watchdog timer leaves from normal operation of a program (p405), a process p406 informs the system control module 600 of an occurrence of a malfunction. When some trouble occurs in the image forming device 400 img or in some part of the printer module 400 (p410), a process P411 identifies a malfunctioning part, analyzes the cause of the malfunction and a process p412 informs the system control module 600 of the results of such identification and analysis. A process P413 performs a fail-safe processing for avoiding danger, such as fire, for example, when the motor 414M is overheated.

Referring now to FIG. 14, when some information input is made to the SCSI terminals S1 or S2 (p420), a process p421 stops the sleep timer. A process p422 examines the contents of the input and branches out to one of five paths. A process p430 (TEST) is a path in a case that a request is made for examining if the printer module 400 is in a condition of being capable of forming an image, and a process p431 informs the conditions of the printer module 400 including the conditions of the additional units which are connected to the printer module 400 optionally. A process p490 (DIAG) is a path in a case that a request for diagnosis is made. Most typically, such a request is made when an occurrence of a malfunction is informed by the process p405 or the process p412, and processes p491 through p493 perform a diagnosis process and a notification process.

A process p440 (SENS) is a path in a case that a request for examining various modes conditions is made, and processes p441–p445 notify mode conditions of the printer module 400 including those of the additional units 480 and 490 which are connected to the printer module 400.

A process p450 (SEL) is a path in a case that a request for a mode selection is made, and processes p251–p256 prescribe parameters for various modes. A process p456 registers that a module to which a request for image data is made is the scanner module 200 in a case of a copy mode, and the system control module 600 in a case of a print mode.

A process p460 (PRINT) is a path in a case that a request for a PRINT command is made, and normally, such a request is made one time for one original document in a case of a mono color copy processing, four times in sequence for one original document in a case of a full color copy processing and two times in sequence in a case of two colors processing. As described earlier, an image of each color is superposed upon one another correctly even if such a request for print for each color arrives at an irregular interval. When this request is made, a process p461 activates a motor 414M, a process p462 commences control of an image forming sequence, and a process p463 monitors detection by the leading edge detect sensor 426. When the detect sensor 426 detects the leading edge of an image, a process p464 is activated immediately to output a data transfer request signal REQ to the scanner module 200 or the system control module 600. A process p465 resets a line counter (scanning line counter) which is provided in the memory RAM. This counter is incremented by one in accordance with a synchronous pulse which is generated by the second synchronous signal generator SYNC for each scanning line. A process p466 is a task for monitoring a period of time since a data transfer request signal REQ is outputted until the receiver side of the data completes preparation for the data for the first line, namely, a period of time during which the position on the surface of the photoconductor drum 414 where the leading edge of an image of the preceding color was located returns to the exposure point 441X, in case such an image of another color exists.

When such a time is elapsed, a process p467 resets the line counter for the second time, opens an entry gate of the FIFO which is a buffer memory for image data and prepares for delivering an image recording signal to a laser drive circuit 441DV through an image signal line DC. Processes from p468 through p472 are a series of tasks for storing image recording data which are received from the terminals S1 and S2 into the FIFO in a unit of image data for one line of the primary scanning. A process p468 detects a synchronous pulse which is generated by the second synchronous signal generator SYNC for each scanning line. A process p469 stores image recording data for 4752 picture elements, which are the data from scanning for one line and obtained from the terminals S1 and S2. A process p470 increments the line counter by one. A process p471 forms a latent image for one line of the primary scanning on the photoconductor drum 414. A process p472 checks if this loop from p468 to p472 is repeated for a number of times corresponding to a number of scanning lines, for example, for 6720 times which corresponds to scanning lines of 6720 in a case of an A3 size image. When laser scanning for a whole page is completed, a process p473 closes an entry gate of the FIFO and discontinues a driving signal of the laser drive circuit 441DV, naturally after completing receipt of image recording data from the terminals S1 and S2.

Then, a process p474 checks if the image formation just completed is the one for the last color. If not, the process discontinues the remaining image forming sequence and a process p480 stops the motor 414M. In a case that the image formation for the last color is completed, processes from p474 through p478 perform paper feeding, second transfer, fixing and exiting processes, and the recorded image 190B is exited from the printer module 400.

Next, operations of the image forming device 400 img are explained referring to FIG. 7.

The printer module 400 forms on a sheet of a paper a full color visible image by superposing images of C, M, Y and K, which are recorded with recording dots with a resolution of ¹/₁₆ mm or ¹/₂₄ mm in both the primary and the secondary directions, in accordance with recording data in 2 bits with a resolution of ¹/₁₆ mm or ¹/₂₄ mm in both the primary and the secondary scanning directions, which are inputted to the printer controller 430 for each of C, M, Y and K. Selection of the resolution of the recording dot of ¹/₁₆ mm or ¹/₂₄ mm is made by a mode select command and prescribed in advance. The resolution of ¹/₁₆ mm is prescribed as a default mode. When an image forming cycle is commenced, the photoconductor drum 414 is rotated counterclockwise and the intermediate transfer belt 415 is rotated clockwise by the driving motor 414M (FIG. 12). As the intermediate transfer belt 415 rotates, a C toner image, a M toner image, a Y toner image and a K toner image are formed in sequence, and are superposed upon each other in that sequence on the intermediate transfer belt 415, forming thereupon a full color toner image.

First, a C toner image is formed in the following manner. A charging scorotron 419 charges the surface of the photoconductor drum 414 uniformly to −700V with a corona discharge. Then, the laser diode 441 performs raster exposure in accordance with a C signal. A recording signal for image formation (image recording data) is provided from the scanner module 200 in a case of a copy mode and from the system control module 600 in a case of a special copy mode which includes intelligent image processing or a facsimile mode or a print mode, in accordance with a data request signal REQ for requesting image recording data to be sent after a prescribed time. Such a request is outputted by the printer module 400 to the scanner module 200 in case of a copy mode and to the system control module 600 in case of a print mode or a facsimile mode.

A recording signal is inputted through the SCSI terminal S1 or S2 of the printer controller 430, and a laser drive circuit 441DV drives the laser diode 441 to emit light in a unit of an inputted picture element in accordance with the recording signal. The recording signal is in 4 bits for one picture element. The laser diode 441 is so controlled to emit light during a full time of the primary scanning in case the picture element is of the maximum C density and no light in case the picture element is of white, and to emit light during a time corresponding to image density data in case the picture element is of intermediate density.

When the photoconductor drum 414 is exposed as described above, electric charge on a part of the drum which is exposed is discharged in accordance with the quantity of the exposure light and a latent image is formed. Toner in the developing unit 420C are charged with negative polarity by being mixed with ferrite carriers, and a C developing roller of the developing unit 420C is biased relative to a metal base of the photoconductor drum 414 at an electric potential in the form of direct current potential with negative polarity superimposed with alternating current potential by an electric source which is not shown in the drawings. As a result, the C toner does not adhere to a part of the photoconductor drum 414 where charge remains and adheres to a part where no charge remains, namely a part which is exposed, thus forming a C visible image (a C toner image).

Further, the laser drive circuit 441DV has a function to generate and add to inputting image data image data for a special image pattern, when forming a Y image, in addition to the above-mentioned control of light emission by the laser diode 441 in accordance with the recording signal. In another words, the laser drive circuit 441DV has a function to drive the laser diode 441 in accordance with the logical sum of the inputting image data and the data for a special image pattern. The special image pattern is a minute image which patterns a system identification number, and is used for tracking an illegal copy, such as a copy of securities.

When the photoconductor drum 414 rotates counterclockwise and reaches a position where a toner image on the photoconductor drum 414 faces the first transfer device 416, the toner image on the photoconductor drum 414 is transferred by corona discharge onto the surface of the intermediate transfer belt 415, which is driven with the same speed as that of the photoconductor drum 414. Residual toners on the surface of the photoconductor drum 414 are cleaned off the surface of the photoconductor drum414 by the cleaning device 421 so that the photoconductor drum 414 is prepared for a next cycle of image formation. The toners which are thus collected are stored in a recycled toner reservoir, which is not shown in the drawing, through a collecting pipe. The intermediate transfer belt 415 is made of a material whose resistivity is relatively high for holding an image formed thereupon for a long period of time. It becomes possible, by using such a material, to hold an image formed on the intermediate transfer belt for a long time, without disordering, for example, 20 minutes, until the next M toner image formation is made.

Next, prior to performing exposure for a M image in accordance with a M signal, the developing units assemblage 420 rotates counterclockwise to face the M developing unit 420M with the photoconductor drum 414. Then, the leading edge of a C toner image which is formed prior to this is detected by the leading edge detect sensor 426, and a request signal REQ, requesting to send recording data for M after a prescribed period of time, is sent to the scanner module 200 or the system control module 600. This request signal is outputted when the leading edge detect sensor 426 detects a C toner mark which is put, in a preceding cycle of image formation, for the purpose of registering an image of each color, in a position which precedes the leading edge of a C toner image by a small gap. Such a mark for the purpose of registering an image of each color may be provided permanently on the intermediate transfer belt 415 instead of putting such a C toner mark. If the M signal is sent synchronizing correctly with this request signal REQ, exposure, development and the first transfer for a M image are so performed that a M toner image is correctly registered with the C toner image, in another words, the M toner image is superposed correctly with the C toner image on the intermediate transfer belt 415. When the photoconductor drum 414 is exposed to a M image, an electric charge on a part of the drum which is exposed is discharged in accordance with the quantity of the exposure light and an electrostatic latent image is formed. M toner in the developing unit 420M are charged with negative polarity by being mixed with ferrite carriers, and a M developing roller of the developing unit 420M contacts the photoconductor drum 414 and is biased at the same electric potential as that of the C developing roller. As a result, the M toner does not adhere to a part of the photoconductor drum 414 where the charge remains and adheres to a part where no charge remains, namely a part which is exposed by the M signal, thus forming a M visible image (a M toner image).

Likewise, a Y image is formed and superposed on a C and M toner image, and a K image is formed superposed on a C, M and Y toner image. In a case of a copy mode, one picture element is rarely developed with all of the four colors since the basic image process circuit 300 performs UCR (under color elimination) processing. A full color image thus formed on the intermediate transfer belt 415, which is rotated at least four times, is moved to a position facing the second transfer device 417.

On the other hand, a copy sheet 190A is fed out from one of the three paper feeders, a cassette 412A, a manual feed tray 412B and an external feed entry (not shown in the drawings), by a paper feeding roller 413A or a paper feeding roller 413B or a pair of a paper feeding rollers 413F, and waits at position where it is nipped by a pair of registration rollers 418R.

The pair of registration rollers 418R are so driven that the leading edge of the copy sheet 190A registers with the leading edge of a toner image on the intermediate transfer belt 415 when the leading edge of the toner image on the intermediate transfer belt 415 reaches the second transfer device 417, thus 5 accomplishing the registration of the copy sheet and the toner image. The copy sheet 190A, contacting the toner image on the intermediate transfer belt 415, passes under the second transfer device 417 which is connected to an electric source with a positive electric potential. When passing under the device, which is a scorotron, the copy sheet 190A is charged with a positive charge by corona discharge current and the toner image is transferred to the copy sheet 190A. When the copy sheet 90A passes a discharger (not shown in the drawing) which is connected to ground provided at the left side of the second transfer device 417, the copy sheet discharges and an adhering force between the intermediate transfer belt 415 and the copy sheet 190A disappears. Then, as dead load of the copy sheet exceeds the adhering force, the copy sheet 190A is separated from the intermediate transfer belt 415 and is moved onto a paper feeding belt 422. The copy sheet 190A carrying thereupon a toner image is forwarded to the fixing unit 423 by the paper feeding belt 422. Heat and pressure are applied to the copy sheet when nipped by the fixing roller 423A and a backup roller 423B, and the toner is melted into the fiber of the copy sheet and fixed therein, thus completing a copy 190B. The completed copy 190B is then exited out from the apparatus by a pair of paper exiting rollers 424. The exited copy sheet 190B is stacked in a tray, which is not shown in the drawing, with the surface carrying an image facing upward.

In a case of a duplex copying, the deflecting roller 425 is moved to the right, as the copy sheet is deflected, to press the coy sheet to the other roller of the pair, so that the copy sheet is reversed, and then, the copy sheet is forwarded into a paper feeding cassette 412A for duplex copying by a pair of feeding rollers 413H. The copy sheet 190C is stacked with the surface carrying an image facing upward.

Next, the system control module 600 is explained referring to FIGS. 4 and 7.

The system control module 600 is constructed from a system controller 630, a console 800 which includes a key input board 810 and a bit-mapped display 820, a floppy disc drive unit 740, an optical-magnetic recording unit or a CD-ROM drive unit 730, an IC card drive unit 745, a third communication unit SCSI and an accelerator 750. These units are all included in a housing of the module 600. The system control module 600 is mountable on a connecting member 400AL2 which is provided on the upper part of the printer module 400 via a connecting member 600AL1.

The console 800 includes an operational plane which is placed on the surface and is positioned in a front side of the apparatus for enabling operation even when the scanner module 200 is mounted thereupon. Further, the floppy disc drive unit 740, the optical-magnetic recording unit or the CD-ROM drive unit 730 and the IC card drive unit 745 are positioned also in the front side of the apparatus for operational convenience, and the connectors S1 and S2 of the third communication unit SCSI are placed in the rear side of the apparatus.

The system controller 630 includes a micro processor CPU, a read/write memory RAM, an interrupt controller INT, a synchronous signal generator SYNC, a crystal oscillator XTL, a DMA controller DMA, a first-in-first-out memory FIFO, a SCSI controller SCSI for a third communication unit, SCSI terminals S1 and S2, a bus BUS, a data channel DC, and an application processor 650, which is physically a hard disk drive unit and stores therein a system control program. Such a hard disk may be replaced with other recording media, such as a ROM, for example.

The system controller 630 enables firstly various module combinations as illustrated in FIGS. 1 and 2, performing system control for each of such combinations. Secondly, the system controller 630 controls an operation of the console 800, such as display or key input. Thirdly, the system controller 630 performs communication control with a facsimile equipment and an external host computer, and generation of recording image data.

The application processor 650 includes various processors, which are software programs stored in a hard disk HDD, including a copy processor CP, a facsimile processor FX, a print processor PR and an intelligent image processor AI. These processors share a hardware resource of the system controller 630 and the functions are realized through execution of the programs stored in the hard disk HDD. The copy processor CP performs a process for accomplishing an image copying function in a system in which the scanner module 200, the printer module 400 and the system control module 600 are connected. The facsimile processor FX performs a process for accomplishing a facsimile function in a system in which the scanner module 200, the printer module 400, the system control module 600 and a public communication line 650FC are connected. The print processor PR performs a process for accomplishing a print function to output a visible image (print out) in a system in which the printer module 400 and the system control module 600 are connected and are so made to receive input data from an external host computer which is connected thereto. The intelligent image processor AI performs an intelligent image processing in a system in which the scanner module 200, the printer module 400 and the system control module 600 are connected.

The intelligent image processing herein refers to a process for changing an original image 180 to an output image 190B which is significantly different from the original image, such as, for example, a process to recognize a character image of an original image which is read by the scanner module 200 and convert the resulting data to a graph. Unlike in a case of a regular copy mode, the intelligent image processor AI once inputs image data into the system control module 600 to be processed by the intelligent image processor AI and then delivers the image data to the printer module 400 to form an image.

Next, functions of the application processor 650 are explained referring to FIGS. 15–18.

Figure 15:
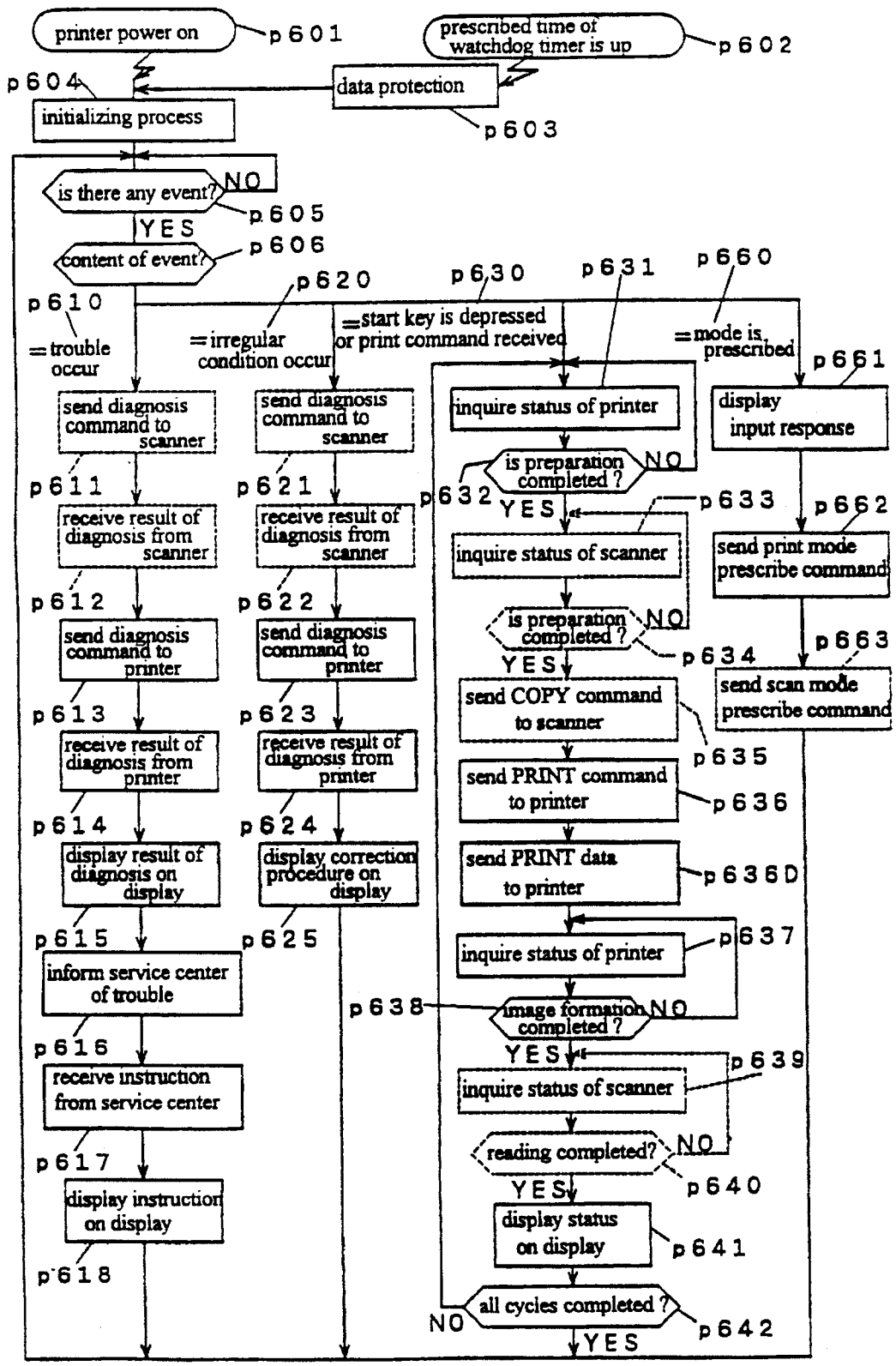
FIG. 15 is a flowchart illustrating processing functions of the system control module.
Figure 16A:
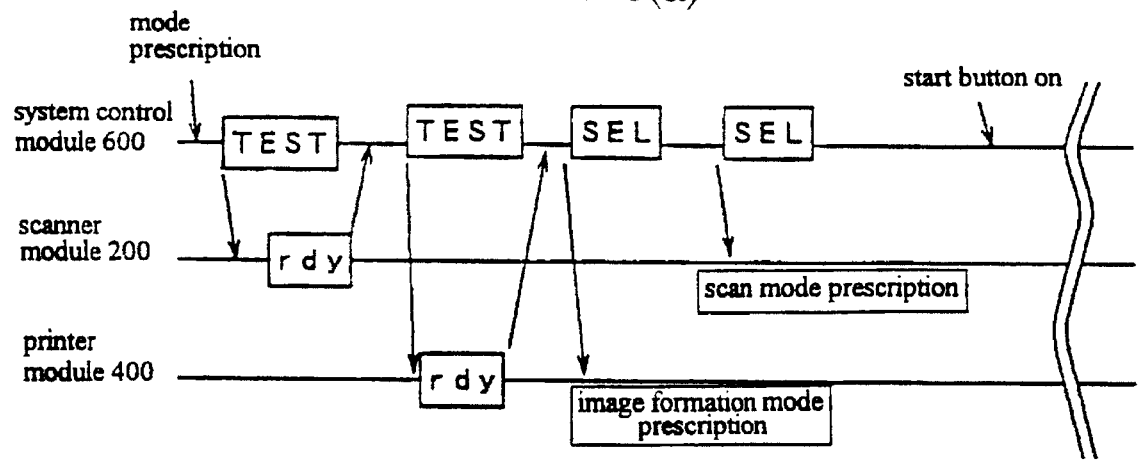
FIGS. 16(a)–16(c) are a time chart, divided into three parts, illustrating operational timing of the system control module, the scanner module and the printer module in a copy mode.
Figure 16B:
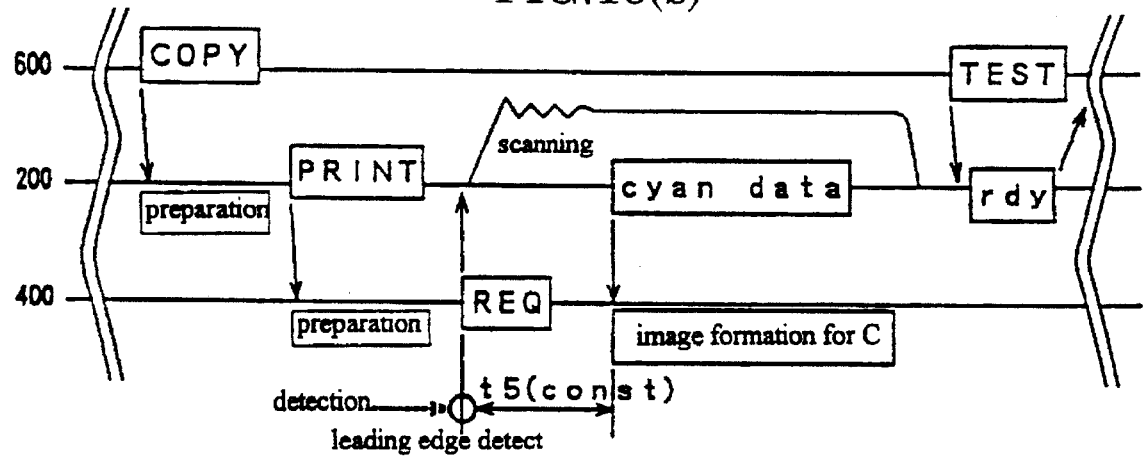
Figure 16C:
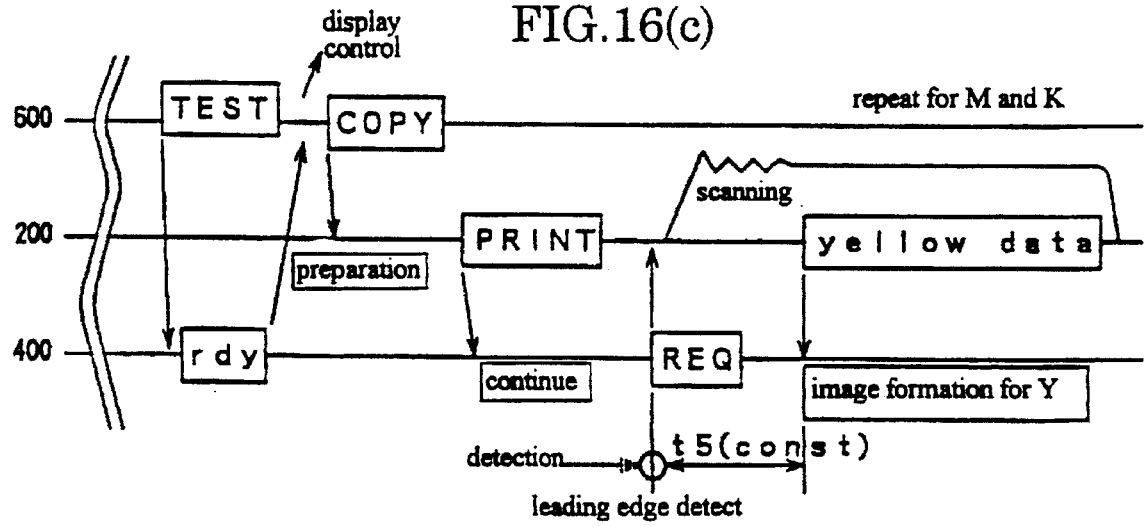
Figure 17A:
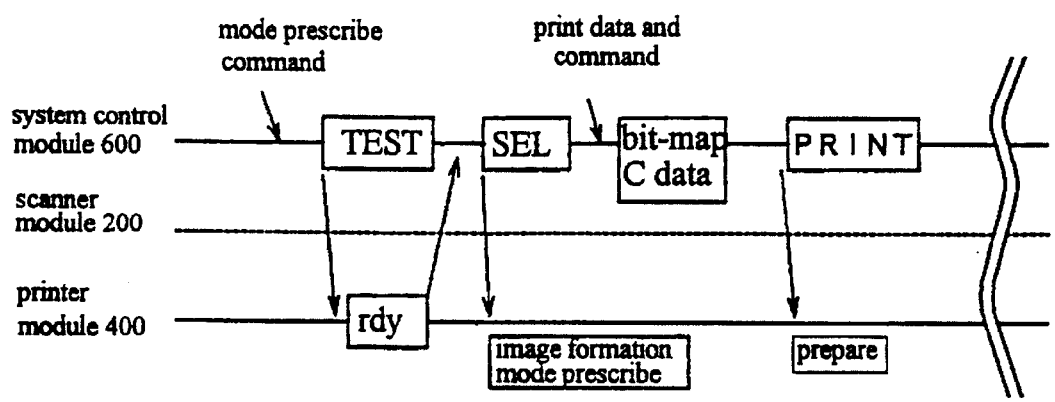
FIGS. 17(a)–17(c) are a time chart, divided into three parts, illustrating operational timing of the system control module, the scanner module and the printer module in a print mode.
Figure 17B:
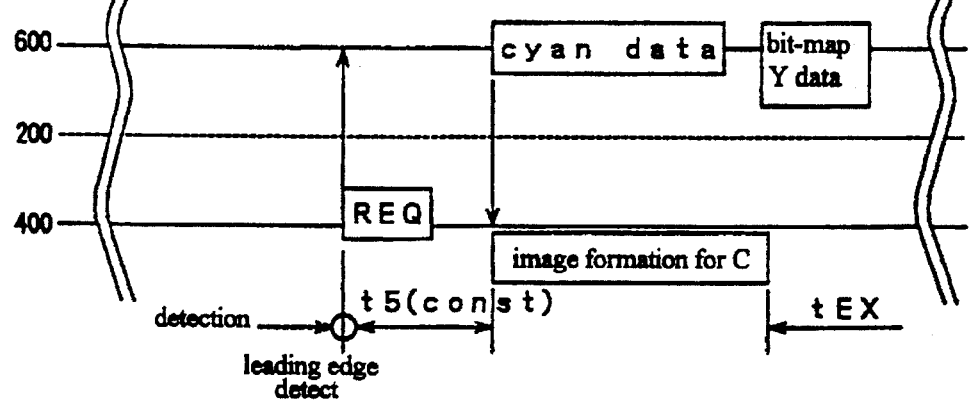
Figure 17C:
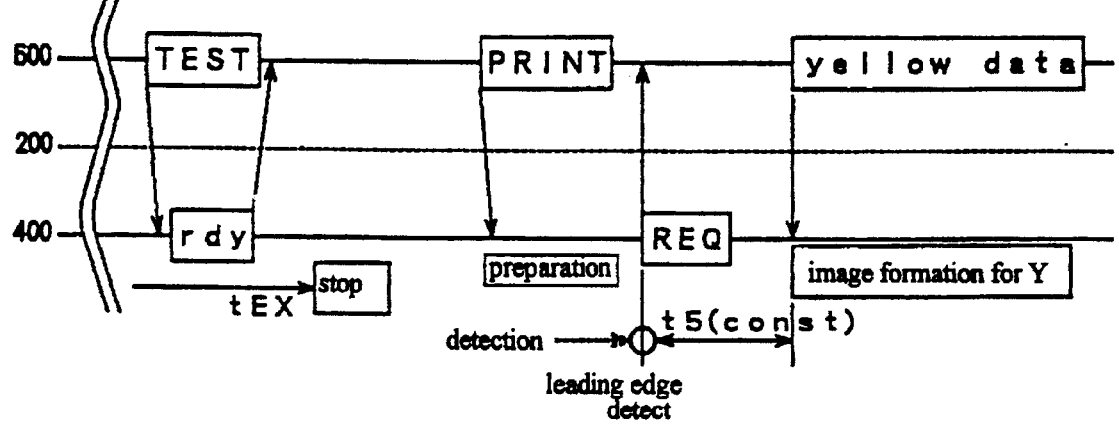
Figure 18:
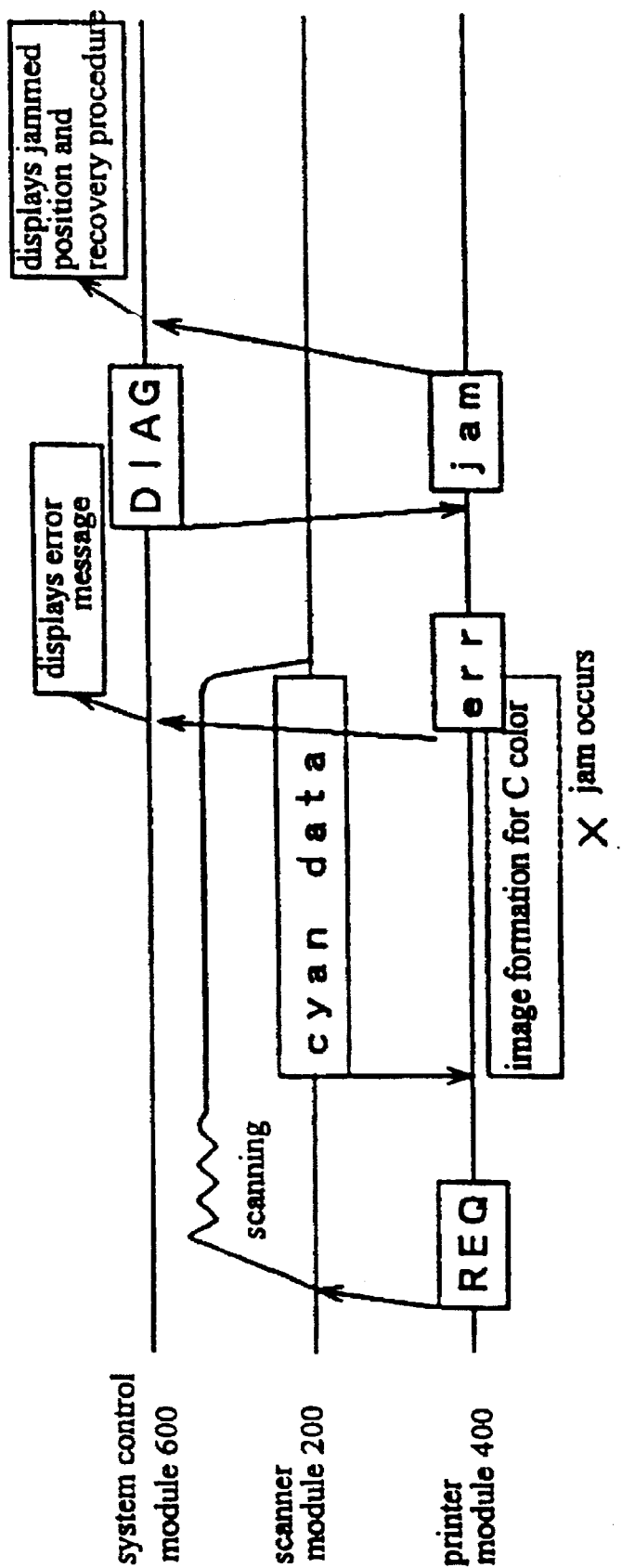
FIG. 18 is a time chart illustrating operational timing of the system control module, the scanner module and the printer module in a case where some malfunction occurs.

FIG. 15 is a flowchart illustrating processes by the copy processor CP and the print processor PR, FIG. 16 is a time chart illustrating an operational timing of the scanner module 200, the printer module 400 and the system control module 600 which are operated by the copy processor CP, FIG. 17 is a time chart illustrating an operational timing of the scanner module 200, the printer module 400 and the system control module 600 which are operated by the print processor PR, and FIG. 18 is a time chart illustrating an operational timing of the scanner module 200, the printer module 400 and the system control module 600 in a case where some trouble occurs while the copy processor CP is being executed.

In FIG. 15, the processes in a thin line box denote processes which are common to the copy processor CP and the print processor PR, the processes in a thin doted line box denote processes peculiar to the copy processor CP and the processes in a thick line box denote processes peculiar to the print processor PR. A copy process and a print process are started when the power of the printer module 400 is made on (p601). The reason why the copy process and the print process are so made to start when the power of the printer module 400 is made on is that the system module 600 is so made to be integrally combined with the printer module 400 and is provided with electric power from the printer module 400. After power of the printer module 400 is made on, a process p604 initializes parameters of various software, for example, parameters of internal registers of the interrupt controller INT. Further, when a prescribed time of the watchdog timer is up (p602), a process p603 saves data which needs to be protected and branches out to an initializing process p604. A process p605 monitors the existence of various events and a process p606 checks contents of the events and the process moves to one of four paths depending upon the contents.

A process p610 is a path in a case that a notice of an occurrence of some trouble is received from the scanner module 200 or the printer module 400, and processes p611 through p614 confirm the content of the notice. A process p615 displays the content of the trouble on the display 820 so that an operator is notified, and a process p616 informs a service center, which is connected through a public communication line, of such information. A process p617 receives an instruction for restoring the trouble from the service center and a process p618 displays such an instruction on the display. A process p620 is a path in a case that a notice of an occurrence of an irregular condition is received from the scanner module 200 or the printer module 400. An irregular condition herein refers to a condition which can be corrected easily by an operator, such as, a state that toner or paper has run out, or a state that a door of the apparatus is not closed, and so on. Processes p621 through p624 confirm the content of the notice, a process p625 displays on the display 820 the content of the irregular condition and messages relating to a procedure for correction of the irregular condition, such as, a message requesting replenishment of toner.

A process p660 is a path in a case that various copy modes, such as an image process mode and a sort mode, are prescribed by an operator via the console 800, or a mode prescribing command is received from a host computer in a print mode. A process p661 displays a responding message on the display 820 and processes p662 and p663 send a mode prescribing command to the scanner module 200 and the printer module 400 respectively.

A process p630 is a path in a case that the start button 811 is depressed or a start command is received from a host computer in a print mode, and processes p631 through p632 send to the printer module 400 inquiries about the status of preparation. In a copy mode, processes p633 and p634 inquire the scanner module 200 about the status of preparation. In case the preparation is completed, a process p635 sends a COPY command to the scanner module 200 in a copy mode only. A process p636 sends a PRINT command to the printer module 400. In a case of a copy mode, commands are exchanged between the scanner module 200 and the printer module 400, and image data are exchanged between the two modules in accordance with a protocol described previously, consequently forming an image. In a case of a print mode, a process p636 transfers image data for one page of a color from the system control module 600 to the printer module 400 in accordance with the protocol previously described. Processes p637 through p640 inquire the scanner module 200 and the printer module 400 if a series of image reading processes and image forming processes are all completed. If the processes are completed and the modules are returned to the initial state, a process p641 displays corresponding information on the display 820. A process p642 checks if the processes are repeated for each of the colors or a prescribed number of copies, and if not, the process returns to the process p631. In a case of a color copy, processes from p631 through P642 are repeated four times.

FIGS. 16, 17 and 18 are time charts illustrating signal flow and operational timings of the scanner module 200, the printer module 400 and the system control module 600. FIG. 16 is a time chart illustrating an operational timing in a copy mode, and FIG. 17 is a time chart illustrating an operational timing in a print mode and FIG. 18 is a time chart illustrating an operational timing in a case that some trouble, such as, paper jamming, occurs while a copy process is being executed.

In a case of a copy mode, referring to FIG. 16, the system control module 600 outputs a PRINT command for each of the colors, namely, four times, at an equal interval in accordance with the instructions from the copy processor CP.

In a case of a print mode, referring to FIG. 17, the system control module 600 outputs a PRINT command for each of the colors at an irregular interval. In case the volume of print data is large, a PRINT command interval between colors generally becomes significantly long compared to an interval in a copy mode. Further, due to variations in the sizes of data for each color and differences in performance in generating bit-mapped data through execution of a software program, a time to complete image data varies, and consequently, a PRINT command for each of the colors is issued at an irregular interval. In a print mode, the printer module 400 and the system control module 600 perform properly even when the scanner module 200 is physically separated, since the scanner module 200 does not perform any relevant function.

FIG. 18 is a time chart illustrating an operational timing in a case that paper jamming occurs in the printer module 400 in a copy mode.

As described above, according to the present invention, the printer controller 430 receives image data for each of C, M, Y and K at an irregular interval, and upon receiving each image data, activates the image forming device 400 img for image formation for the color whose data is received, and further, after completing image formation for all of the colors, outputs a visible image in full color on a recording media 190A. Therefore, when viewed from a view point of an external host computer, the color image forming apparatus according to the present invention is very flexible in timing of receiving image data for each color from an external equipment, and therefore, is suitable for the use with various external equipment. Further, the color image forming apparatus according to the present invention does not need to be provided with a memory for storing a large amount of printing data for each color.

Further, according to the present invention, the leading edge detect sensor 426 detects the leading edge of an image of a color which is formed in a preceding image formation cycle, and the printer controller 430 controls a series of image registration for each of the colors. Therefore, even if image formation for each of the colors is made at an irregular interval, image registration for each of the colors is made correctly and no discrepancy in color registration occurs.

Further, an image in full color is formed on the intermediate transfer belt 415, and is then transferred onto a recording media 190A to be outputted. Therefore, even if image formation for each of C, M, Y and K is made at an irregular interval and changes in environmental conditions, such as a change in the temperature, occur during such an interval, image registration for each of the colors is made correctly and no discrepancy in color registration occurs.

Further, according to the present invention, the printer controller 430 receives image data for each of the colors at an irregular interval, and upon receiving each image data, activates the image forming device 400img for image formation for the color whose data is received, and further, after completing image formation for all of the colors, outputs a visible image in full color on a recording media 190A. Further, the scanner module 200 converts an original image to recording data to output, and the system control module 600 issues an image formation command for each of the colors at a regular interval in a copy mode and at an irregular interval in a print mode. Therefore, the color image forming apparatus according to the present invention forms an image in the shortest period of time in a copy mode. And in a print mode, when viewed from a view point of an external host computer, the apparatus is very flexible in timing of receiving image data for each color from external equipment, and therefore, is suitable for use with various types of external equipment. Further, the apparatus does not need to be provided with a memory for storing a large amount of printing data for each color.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A color image forming apparatus, comprising:
   an image data input device receiving color image data for one page in a form divided into a plurality of data for each of a corresponding plurality of colors;
   an image forming device converting image data for each of the plurality of colors to a visible image; and
   a printer controller receiving image data for each of the plurality of colors at an irregular interval and driving the image forming device, upon receiving the image data for one color, to form an image of the one color whose data has been received, and after completing image formation for all of the plurality of colors, forming a final image and outputting the final image on a recording media as a visible image.

2. The color image forming apparatus according to claim 1, wherein said image forming device includes a device for detecting a leading edge of an image, and said printer controller registers leading edges of images of the plurality of colors based upon a detecting signal from said leading edge detecting device.

3. The color image forming apparatus according to claim 1, wherein said image forming device includes an intermediate image transfer belt for forming thereupon an image of each of the plurality of colors one by one superposing one on top of another.

4. The image forming apparatus according to claim 3, wherein said image forming device includes a device for detecting a leading edge of an image which is formed on said intermediate image transfer belt, and said printer controller registers leading edges of images of the plurality of colors based upon a detecting signal from said leading edge detecting device.

5. A color image forming apparatus, comprising: a printer module including:
   an image data input device receiving color image data for one page in a form divided into a plurality of data for each of a corresponding plurality of colors,
   an image forming device converting image data for each of the plurality of colors to a visible image, and
   a printer controller receiving image data for each of the plurality of colors at an irregular interval and driving the image forming device, upon receiving the image data for one color, to form an image of the one color whose data has been received, and after completing image formation for all of the plurality of colors, forming a final image and outputting the final image on a recording media as a visible image;
   a scanner module including:
      an image reading device reading an image, separating the image in color for each picture element,
      an image processing device converting color image data which are obtained by the image reading device to image recording data, and
   an image data output device; and a system control module including:
      a copy processor issuing to the scanner module and the printer module an image formation command for each of the plurality of colors at a regular interval, and
      a print processor issuing to the printer module an image formation command for each of the plurality of colors at an irregular interval.

6. A color image forming apparatus, comprising:
   an image data input means for receiving color image data for one page in a form divided into a plurality of data for each of a corresponding plurality of colors;
   an image forming means for converting image data for each of the plurality of colors to a visible image; and
   a printer control means for receiving image data for each of the plurality of colors at an irregular interval and driving the image forming means, upon receiving the image data for one color, to form an image of the one color whose data has been received, and after completing image formation for all of the plurality of colors, forming a final image and outputting the final image on a recording means as a visible image.

7. The color image forming apparatus according to claim 6, wherein said image forming means includes a means for detecting a leading edge of an image, and said printer control means registers leading edges of images of the plurality of colors based upon a detecting signal from said leading edge detecting means.

8. The color image forming apparatus according to claim 6, wherein said image forming means includes an intermediate image transfer means for forming thereupon an image of each of the plurality of colors one by one superposing one on top of another.

9. The image forming apparatus according to claim 8, wherein said image forming means includes a means for detecting a leading edge of an image which is formed on said intermediate image transfer means, and said printer control means registers leading edges of images of the plurality of colors based upon a detecting signal from said leading edge detecting means.

10. The image forming apparatus according to Claim 6, further comprising:
    a scanner means including:
       an image reading means reading an image, separating the image in color for each picture element,
       an image processing means converting color image data which are obtained by the image reading means to image recording data.

11. The image forming apparatus according to claim 10, further comprising:
    a system control means including:
       a copy processor means for issuing to the scanner means and the print control means an image formation command for each of the plurality of colors at a regular interval, and
       a print processor means for issuing to the print control means an image formation command for each of the plurality of colors at an irregular interval.

* * * * *